(12) United States Patent
Long

(10) Patent No.: US 12,269,681 B2
(45) Date of Patent: Apr. 8, 2025

(54) SYSTEMS AND METHODS FOR PROVIDING ORDER FULFILLMENT USING A ROUTING CONVEYANCE SYSTEM

(71) Applicant: Berkshire Grey Operating Company, Inc., Bedford, MA (US)

(72) Inventor: Guoming Alex Long, Wexford, PA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 913 days.

(21) Appl. No.: 17/193,377

(22) Filed: Mar. 5, 2021

(65) Prior Publication Data
US 2021/0276796 A1    Sep. 9, 2021

Related U.S. Application Data

(60) Provisional application No. 62/986,406, filed on Mar. 6, 2020.

(51) Int. Cl.
*B65G 1/04* (2006.01)
*B65G 1/137* (2006.01)
*B65G 47/90* (2006.01)

(52) U.S. Cl.
CPC ......... *B65G 1/0485* (2013.01); *B65G 1/0435* (2013.01); *B65G 1/1371* (2013.01);
(Continued)

(58) Field of Classification Search
CPC .. B65G 1/0485; B65G 1/0435; B65G 1/1371; B65G 47/90; B65G 2203/0208; B65G 2203/04; B65G 1/1378; B65G 1/1373
See application file for complete search history.

(56) References Cited

U.S. PATENT DOCUMENTS

| 3,750,804 A | 8/1973 | Lemelson |
| 3,951,276 A | 4/1976 | Moses |

(Continued)

FOREIGN PATENT DOCUMENTS

| CA | 3043018 A1 * | 5/2018 | ............. B65G 47/40 |
| CA | 3057334 A1 * | 9/2018 | ............. B25J 9/0093 |

(Continued)

OTHER PUBLICATIONS

International Search Report and Written Opinion of the International Searching Authority, the European Patent Office, issued in related International Application No. PCT/US2022/046561 on Feb. 13, 2023, 13 pages.

(Continued)

*Primary Examiner* — Jacob S. Scott
*Assistant Examiner* — Erin Morris
(74) *Attorney, Agent, or Firm* — Gesmer Updegrove LLP

(57) ABSTRACT

A storage, retrieval and processing system for processing objects includes: a plurality of bins including objects to be distributed, said plurality of bins being provided on an input conveyance system; a programmable motion device that includes an end effector for grasping and moving any of the objects, a perception system for providing perception data regarding a selected object that is presented to the perception system by the programmable motion device, and a routing conveyance system for receiving the selected object, and for moving the selected object in each of horizontal and vertical directions toward a selected destination container responsive to the perception data, the routing conveyance system including at least one object conveyor for urging the selected object toward the selected destination container in a third direction that is generally orthogonal to the horizontal and vertical directions.

20 Claims, 16 Drawing Sheets

(52) U.S. Cl.
CPC ...... *B65G 47/90* (2013.01); *B65G 2203/0208* (2013.01); *B65G 2203/04* (2013.01)

(56) References Cited

U.S. PATENT DOCUMENTS

| | | | |
|---|---|---|---|
| 4,542,808 A | 9/1985 | Lloyd, Jr. et al. | |
| 4,622,875 A | 11/1986 | Emery et al. | |
| 4,678,390 A | 7/1987 | Bonneton et al. | |
| 4,722,653 A | 2/1988 | Williams et al. | |
| 4,815,582 A | 3/1989 | Canziani | |
| 4,846,335 A | 7/1989 | Hartlepp | |
| 4,895,242 A | 1/1990 | Michel | |
| 5,190,162 A | 3/1993 | Harlepp | |
| 5,271,703 A | 12/1993 | Lindqvist et al. | |
| 5,595,263 A | 1/1997 | Pignataro | |
| 5,647,473 A | 7/1997 | Miller et al. | |
| 5,794,789 A | 8/1998 | Payson et al. | |
| 5,875,434 A | 2/1999 | Matsuoka et al. | |
| 6,006,946 A | 12/1999 | Williams et al. | |
| 6,076,023 A | 6/2000 | Sato | |
| 6,189,702 B1 | 2/2001 | Bonnet | |
| 6,208,908 B1 | 3/2001 | Boyd et al. | |
| 6,246,023 B1 | 6/2001 | Kugle | |
| 6,377,867 B1 | 4/2002 | Bradley et al. | |
| 6,505,093 B1 | 1/2003 | Thatcher et al. | |
| 6,513,641 B1 | 2/2003 | Affaticati et al. | |
| 6,688,459 B1 | 2/2004 | Bonham et al. | |
| 6,705,528 B2 | 3/2004 | Good et al. | |
| 6,762,382 B1 | 7/2004 | Danelski | |
| 7,861,844 B2 | 1/2011 | Hayduchok et al. | |
| 8,718,814 B1 | 5/2014 | Clark et al. | |
| 8,776,694 B2 | 7/2014 | Rosenwinkel et al. | |
| 8,798,784 B1 | 8/2014 | Clark et al. | |
| 8,851,272 B1 | 10/2014 | Hill | |
| 9,020,632 B2 | 4/2015 | Naylor | |
| 9,272,845 B2 | 3/2016 | Honkanen et al. | |
| 9,364,865 B2 | 6/2016 | Kim | |
| 9,481,518 B2 | 11/2016 | Neiser | |
| 9,694,977 B2 | 7/2017 | Aprea et al. | |
| 9,937,532 B2 | 4/2018 | Wagner et al. | |
| 9,975,148 B2 | 5/2018 | Zhu et al. | |
| 10,007,827 B2 | 6/2018 | Wagner et al. | |
| 10,029,865 B1 | 7/2018 | McCalib, Jr. et al. | |
| 10,086,998 B1 | 10/2018 | Tilekar et al. | |
| 10,438,034 B2 | 10/2019 | Wagner et al. | |
| 10,518,974 B2 | 12/2019 | Lee et al. | |
| 10,577,180 B1 | 3/2020 | Mehta et al. | |
| 10,596,696 B2 | 3/2020 | Wagner et al. | |
| 10,632,610 B2 | 4/2020 | Wagner et al. | |
| 10,649,445 B2 | 5/2020 | Wagner et al. | |
| 10,730,077 B2 | 8/2020 | Wagner et al. | |
| 10,843,333 B2 | 11/2020 | Wagner et al. | |
| 10,894,674 B2 | 1/2021 | Wagner et al. | |
| 10,906,740 B2 | 2/2021 | Wagner et al. | |
| 11,020,770 B1 | 6/2021 | Tilekar et al. | |
| 11,338,999 B2 | 5/2022 | Hu | |
| 11,472,633 B2 | 10/2022 | Wagner et al. | |
| 2002/0091801 A1 | 7/2002 | Lewin et al. | |
| 2002/0179400 A1 | 12/2002 | Dersham et al. | |
| 2002/0179502 A1 | 12/2002 | Cerutti et al. | |
| 2003/0218307 A1 | 11/2003 | Anderson et al. | |
| 2005/0002762 A1 | 1/2005 | Gambarelli et al. | |
| 2006/0045672 A1 | 3/2006 | Maynard et al. | |
| 2008/0181753 A1 | 7/2008 | Bastian et al. | |
| 2009/0129902 A1 | 5/2009 | Schafer | |
| 2010/0036675 A1 | 2/2010 | Schäfer | |
| 2010/0096243 A1 | 4/2010 | Balk | |
| 2010/0300842 A1 | 12/2010 | Bastian, II et al. | |
| 2010/0316469 A1 | 12/2010 | Lert et al. | |
| 2011/0056806 A1 | 3/2011 | Johnson | |
| 2011/0144798 A1 | 6/2011 | Freudelsperger | |
| 2011/0262253 A1 | 10/2011 | Krizmanic et al. | |
| 2012/0029687 A1* | 2/2012 | Hagen | G07F 11/165 700/218 |
| 2012/0128454 A1 | 5/2012 | Hayduchok et al. | |
| 2012/0177465 A1* | 7/2012 | Koholka | B65G 1/0485 414/807 |
| 2012/0328397 A1 | 12/2012 | Yamashita | |
| 2013/0051696 A1 | 2/2013 | Garrett et al. | |
| 2014/0031972 A1 | 1/2014 | DeWitt et al. | |
| 2014/0056672 A1 | 2/2014 | Mathys et al. | |
| 2014/0086714 A1 | 3/2014 | Malik | |
| 2014/0142746 A1 | 5/2014 | Vegh et al. | |
| 2014/0212257 A1 | 7/2014 | Yamashita | |
| 2014/0244026 A1 | 8/2014 | Neiser | |
| 2014/0277692 A1 | 9/2014 | Buzan et al. | |
| 2014/0277693 A1 | 9/2014 | Naylor | |
| 2014/0288696 A1 | 9/2014 | Lert | |
| 2015/0098775 A1 | 4/2015 | Razumov | |
| 2015/0294260 A1 | 10/2015 | Napoli | |
| 2016/0107848 A1 | 4/2016 | Baker | |
| 2016/0122135 A1* | 5/2016 | Bastian, II | B65G 37/00 198/347.1 |
| 2016/0221757 A1 | 8/2016 | DeWitt et al. | |
| 2016/0355337 A1* | 12/2016 | Lert | B65G 1/0492 |
| 2017/0015502 A1 | 1/2017 | Engel et al. | |
| 2017/0043953 A1 | 2/2017 | Battles et al. | |
| 2017/0057756 A1 | 3/2017 | Dugat et al. | |
| 2017/0136632 A1 | 5/2017 | Wagner et al. | |
| 2017/0173638 A1* | 6/2017 | Wagner | B07C 5/3412 |
| 2017/0267452 A1 | 9/2017 | Goren et al. | |
| 2017/0330135 A1 | 11/2017 | Taylor et al. | |
| 2017/0349385 A1 | 12/2017 | Maroni et al. | |
| 2018/0037410 A1 | 2/2018 | DeWitt | |
| 2018/0057264 A1 | 3/2018 | Wicks et al. | |
| 2018/0075402 A1 | 3/2018 | Stadie et al. | |
| 2018/0085788 A1 | 3/2018 | Engel | |
| 2018/0105363 A1 | 4/2018 | Lisso | |
| 2018/0208397 A1 | 7/2018 | Schack et al. | |
| 2018/0251302 A1 | 9/2018 | Valinsky et al. | |
| 2018/0265311 A1 | 9/2018 | Wagner et al. | |
| 2018/0273296 A1 | 9/2018 | Wagner et al. | |
| 2018/0273298 A1 | 9/2018 | Wagner et al. | |
| 2018/0282066 A1 | 10/2018 | Wagner et al. | |
| 2018/0290830 A1 | 10/2018 | Valinsky et al. | |
| 2018/0327198 A1 | 11/2018 | Wagner et al. | |
| 2018/0354719 A1 | 12/2018 | Hoffman | |
| 2019/0218033 A1 | 7/2019 | Muttathil et al. | |
| 2019/0329979 A1 | 10/2019 | Wicks et al. | |
| 2020/0005005 A1 | 1/2020 | Wagner et al. | |
| 2020/0016746 A1 | 1/2020 | Yap et al. | |
| 2020/0039745 A1 | 2/2020 | Khodl et al. | |
| 2020/0152259 A1 | 5/2020 | DeWitt et al. | |
| 2020/0265380 A1 | 8/2020 | Dubois et al. | |
| 2020/0302390 A1 | 9/2020 | Elazary et al. | |
| 2020/0407178 A1 | 12/2020 | Battles et al. | |
| 2021/0039140 A1 | 2/2021 | Geyer et al. | |
| 2021/0039881 A1 | 2/2021 | Zhu et al. | |
| 2021/0039887 A1 | 2/2021 | Zhu et al. | |
| 2021/0047117 A1 | 2/2021 | Stevens et al. | |
| 2021/0047118 A1 | 2/2021 | Stevens et al. | |
| 2021/0178826 A1 | 6/2021 | Lutz et al. | |
| 2021/0276797 A1 | 9/2021 | Velagapudi et al. | |
| 2021/0276798 A1 | 9/2021 | Velagapudi et al. | |
| 2021/0276799 A1 | 9/2021 | Velagapudi et al. | |
| 2021/0300685 A1 | 9/2021 | Dieges et al. | |
| 2021/0394807 A1 | 12/2021 | Kontuniemi et al. | |
| 2022/0089387 A1 | 3/2022 | Dederichs et al. | |
| 2022/0234825 A1 | 7/2022 | Krishnamoorthy et al. | |
| 2022/0284393 A1 | 9/2022 | Al et al. | |
| 2022/0356017 A1 | 11/2022 | Romano et al. | |
| 2023/0077893 A1 | 3/2023 | Gebhardt et al. | |
| 2023/0112778 A1 | 4/2023 | O'Hern et al. | |
| 2023/0119061 A1 | 4/2023 | Halamka et al. | |
| 2023/0137545 A1 | 5/2023 | Austrheim | |
| 2023/0150770 A1 | 5/2023 | Sebastian | |
| 2023/0219767 A1 | 7/2023 | Demir et al. | |
| 2023/0249914 A1 | 8/2023 | Fosnight et al. | |

(56) References Cited

U.S. PATENT DOCUMENTS

2023/0271785 A1  8/2023  Gravelle et al.
2023/0331475 A1  10/2023 Yamashita

FOREIGN PATENT DOCUMENTS

| | | | | |
|---|---|---|---|---|
| CN | 102001506 A | 4/2011 | | |
| CN | 102264602 A | 11/2011 | | |
| CN | 103332426 A | 10/2013 | | |
| CN | 104169196 A | 11/2014 | | |
| CN | 104859990 A | 8/2015 | | |
| CN | 104925440 A | 9/2015 | | |
| CN | 205257168 U | 5/2016 | | |
| CN | 105858042 A | 8/2016 | | |
| CN | 205820147 U | 12/2016 | | |
| CN | 104495181 B | 2/2017 | | |
| CN | 206456846 U | 9/2017 | | |
| CN | 107635896 A | 1/2018 | | |
| CN | 107720072 A | 2/2018 | | |
| CN | 108146948 A | * 6/2018 | ............... | B65G 1/04 |
| CN | 108700869 A | 10/2018 | | |
| CN | 109081027 A | 12/2018 | | |
| CN | 110062740 A | 7/2019 | | |
| CN | 110325462 A | 10/2019 | | |
| CN | 209506761 U | 10/2019 | | |
| CN | 110431097 A | * 11/2019 | ............... | B65G 1/04 |
| CN | 110461734 A | 11/2019 | | |
| CN | 110462657 A | 11/2019 | | |
| CN | 209720654 U | 12/2019 | | |
| CN | 110662707 A | 1/2020 | | |
| CN | 110691742 A | 1/2020 | | |
| CN | 110740954 A | * 1/2020 | ........... | B07C 5/3412 |
| CN | 110803439 A | 2/2020 | | |
| CN | 115210152 A | 10/2022 | | |
| CN | 115243987 A | 10/2022 | | |
| CN | 115243988 A | 10/2022 | | |
| CN | 117255718 A | 12/2023 | | |
| CN | 118139798 A | 6/2024 | | |
| DE | 102004014378 A1 | 10/2005 | | |
| DE | 102008046325 A1 | 3/2010 | | |
| EP | 1151942 | 11/2001 | | |
| EP | 1151942 A2 | 11/2001 | | |
| EP | 2818433 A1 | 12/2014 | | |
| EP | 3354598 A1 | * 8/2018 | ............... | B65G 1/04 |
| EP | 3572355 A1 | 11/2019 | | |
| EP | 4114766 A2 | 1/2023 | | |
| EP | 4114767 A1 | 1/2023 | | |
| EP | 4114768 A1 | 1/2023 | | |
| EP | 4114769 A1 | 1/2023 | | |
| EP | 4334045 A2 | 3/2024 | | |
| JP | S5826703 A | 2/1983 | | |
| JP | S6015302 A | 1/1985 | | |
| JP | 2007131383 A | 5/2007 | | |
| JP | 2003104513 A | 4/2009 | | |
| JP | 2013052958 A | 3/2013 | | |
| JP | 2008110779 A | 5/2015 | | |
| JP | 2009035407 A | 2/2019 | | |
| TW | 201300298 A | 1/2013 | | |
| WO | 2007009136 A1 | 1/2007 | | |
| WO | 2009089159 A2 | 7/2009 | | |
| WO | 2010040809 A1 | 4/2010 | | |
| WO | 2011012611 A1 | 2/2011 | | |
| WO | 2014080041 A | 11/2011 | | |
| WO | 2012106744 A1 | 8/2012 | | |
| WO | 2014080041 A1 | 5/2014 | | |
| WO | 2016105201 A2 | 6/2016 | | |
| WO | 2017123678 A1 | 7/2017 | | |
| WO | WO-2018175466 A1 | * 9/2018 | ............... | B65G 1/04 |
| WO | 2018195196 A1 | 10/2018 | | |
| WO | 2021026359 A1 | 2/2021 | | |
| WO | 2021178819 A1 | 9/2021 | | |
| WO | 2021178830 A1 | 9/2021 | | |
| WO | 2022236038 A2 | 11/2022 | | |
| WO | 2023064465 A1 | 4/2023 | | |

OTHER PUBLICATIONS

Non-Final Office Action issued by the United States Patent and Trademark Office in related U.S. Appl. No. 17/193,378 on Aug. 4, 2023, 26 pages.

Notice on the Second Office Action, along with its English translation, issued by the China National Intellectual Property Administration in related Chinese Patent Application No. 202180018310.4 on Oct. 11, 2023, 24 pages.

Notice on the Second Office Action, along with its English translation, issued by the China National Intellectual Property Administration in related Chinese Patent Application No. 202180018333.5 on Oct. 12, 2023, 35 pages.

Notice on the Second Office Action, along with its English translation, issued by the China National Intellectual Property Administration in related Chinese Patent Application No. 202180018364.0 on Oct. 11, 2023, 19 pages.

International Preliminary Report on Patentability issued by the International Bureau of WIPO in related International application No. PCT/US2022/028047 on Oct. 24, 2023, 14 pages.

Notice of First Office Action, along with its English translation, issued by the China National Intellectual Property Office in related Chinese Patent Application No. 202180018333.5 on Mar. 31, 2023, 32 pages.

Notice of First Office Action, along with its English translation, issued by the China National Intellectual Property Office in related Chinese Patent Application No. 202180018436.1 on Mar. 31, 2023, 17 pages.

Notice on the First Office Action, along with its English translation, issued by the China National Intellectual Property Administration, in related Chinese Patent Application No. 202180018364.0 on Mar. 30, 2023, 23 pages.

Notice on the First Office Action, along with its English translation, issued by the China National 4 Intellectual Property Administration, in related Chinese Patent Application No. 202180018310.4 on Mar. 30, 2023, 21 pages.

Examiner's Report issued by the Innovation, Science and Economic Development Canada (Canadian Intellectual Property Office) in related Canadian Patent Application No. 3,174,544 on Nov. 6, 2023, 4 pages.

Examiner's Report issued by the Innovation, Science and Economic Development Canada (Canadian Intellectual Property Office) in related Canadian Patent Application No. 3,174,546 on Nov. 7, 2023, 4 pages.

Examiner's Report issued by the Innovation, Science and Economic Development Canada (Canadian Intellectual Property Office) in related Canadian Patent Application No. 3,174,543 on Nov. 6, 2023, 4 pages.

Examiner's Report issued by the Innovation, Science and Economic Development Canada (Canadian Intellectual Property Office) in related Canadian Patent Application No. 3,174,552 on Nov. 29, 2023, 6 pages.

Communication pursuant to Rules 161(1) and 162 EPC issued by the European Patent Office in related European Patent Application No. 22727547.6 on Dec. 14, 2023, 3 pages.

Annex to Form PCT/ISA/206, Communication Relating to the Results of the Partial International Search issued by the European Patent Office, as the International Searching Authority, in related International Application No. PCT/US2022/028047 on Sep. 22, 2022, 2 pages.

Communication pursuant to Rules 161(1) and 162 EPC issued by the European Patent Office in related European Patent Application No. 21714592.9 on Oct. 13, 2022, 3 pages.

Communication pursuant to Rules 161(1) and 162 EPC issued by the European Patent Office in related European Patent Application No. 21714588.7 on Oct. 13, 2022, 3 pages.

Communication pursuant to Rules 161(1) and 162 EPC issued by the European Patent Office in related European Patent Application No. 21714590.3 on Oct. 13, 2022, 3 pages.

Communication pursuant to Rules 161(1) and 162 EPC issued by the European Patent Office in related European Patent Application No. 21715372.5 on Oct. 13, 2022, 3 pages.

(56) References Cited

OTHER PUBLICATIONS

International Search Report and the Written Opinion of the International Searching Authority, or the Declaration, and the International Search Report and Written Opinion of the International Searching Authority (the European Patent Office) issued in related International Application No. PCT/US2022/028047 on Nov. 14, 2022, 20 pages.
Annex to Form PCT/ISA/206, Communication Relating to the Results of the Partial International Search and Provisional Opinion Accompanying the Partial Search Result issued by the International Searching Authority, the European Patent Office, in related International Application No. PCT/US2021/021140 on Jul. 6, 2021, 2 pages.
International Search Report and Written Opinion issued by the International Searching Authority (the European Patent Office) in related International Application No. PCT/US2021/021128 on Jun. 21, 2021, 12 pages.
International Search Report and Written Opinion issued by the International Searching Authority (the European Patent Office) in related International Application No. PCT/US2021/021140 on Sep. 3, 2021, 16 pages.
International Search Report and Written Opinion of the International Searching Authority issued by the European Patent Office in related International Application No. PCT/US2021/021133 on Jun. 21, 2021, 11 pages.
International Preliminary Report on Patentability issued by the International Bureau of WIPO in related International Application No. PCT/US2021/021118 on Sep. 6, 2022, 9 pages.
International Preliminary Report on Patentability issued by the International Bureau of WIPO in related International Application No. PCT/US2021/021128 on Sep. 6, 2022, 8 pages.
International Preliminary Report on Patentability issued by the International Bureau of WIPO in related International Application No. PCT/US2021/021133 on Sep. 6, 2022, 7 pages.
International Preliminary Report on Patentability issued by the International Bureau of WIPO in related International Application No. PCT/US2021/021140 on Sep. 15, 2022, 10 pages.
International Search Report and Written Opinion of the International Searching Authority, the European Patent Office, issued in related International Application No. PCT/US2021/021118 on Jul. 16, 2021, 12 pages.
Notice on the First Office Action, along with its English translation, issued by the China National Intellectual Property Administration, in related Chinese Patent Application No. 202180018310.4 on Mar. 30, 2023, 21 pages.
Notice of First Office Action, along with its English translation, issued by the China National Intellectual 3 Property Office in related Chinese Patent Application No. 202180018333.5 on Mar. 31, 2023, 32 pages.
Notice of First Office Action, along with its English translation, issued by the China National Intellectual 4 Property Office in related Chinese Patent Application No. 202180018436.1 on Mar. 31, 2023, 17 pages.
Chinese Thesis of Zhang et al., Warehouse Management Practices, Aviation Industry Press, Jan. 2012, pp. 56-59, 15 pages, including the English translation prepared by Shanghai Patent & Trademark Law Office, LLC.
International Preliminary Report on Patentability issued by the International Bureau of WIPO in related international application No. PCT/US2022/046561 on Apr. 16, 2024, 7 pages.
Non-Final Office Action issued by the United States Patent and Trademark Office in related U.S. Appl. No. 17/193,380 on Mar. 27, 2024, 40 pages.
Non-Final Office Action issued by the United States Patent and Trademark Office in related U.S. Appl. No. 17/193,384 on Apr. 5, 2024, 38 pages.
Notice of Third Office Action, along with its English translation, issued by the China National Intellectual Property Administration in related Chinese Patent Application No. 202180018310.4 on Apr. 17, 22 pages.
Notice of Third Office Action, along with its English translation, issued by the China National Intellectual Property Administration in related Chinese Patent Application No. 202180018333.5 on Apr. 17, 31 pages.
Notice of Third Office Action, along with its English translation, issued by the China National Intellectual Property Administration in related Chinese Patent Application No. 202180018364.0 on Apr. 17, 2024, 24 pages.
Communication pursuant to Rules 161(1) and 162 EPC issued by the European Patent Office in related European Patent Application No. 22809552.7 on May 22, 2024, 3 pages.
Decision on Rejection, along with its English translation, issued by the China National Intellectual Property Administration in related Chinese Patent Application No. 202180018310.4 on Sep. 13, 2024, 33 pages.
Chapter 5 High-bay Warehouses and equipment thereof of Modern Machinery and Equipment Design Manual, vol. 3, Non-Standard Machinery and Equipment Design, edited by Fan Zuyao, pp. 16-261, China Machine Press, Oct. 1996, 7 pages.
Non-Final Office Action issued by the United States Patent and Trademark Office in related U.S. Appl. No. 17/965,420 on Nov. 18, 2024, 11 pages.
International Search Report and Written Opinion of the International Searching Authority issued by the European Patent Office, as the International Searching Authority, in related International application No. PCT/US2024/052472 on Jan. 22, 2025, 14 pages.

\* cited by examiner

SYSTEMS AND METHODS FOR PROVIDING ORDER FULFILLMENT USING A ROUTING CONVEYANCE SYSTEM

PRIORITY

The present application claims priority to U.S. Provisional Patent Application No. 62/986,406 filed Mar. 6, 2020, the disclosure of which is hereby incorporated by reference in its entirety.

BACKGROUND

The present invention relates to order fulfillment systems, and relates in particular to systems for providing aggregation of objects (e.g., products, packages, bags, items, goods, etc.) for preparation for shipment to destination locations, such as in Automated Storage and Retrieval Systems.

Order fulfillment systems typically involve the processing of a wide variety of objects for distribution to a large number of distribution locations, such as intermediate distribution stations, mail order stations, geographic group locations and address specific locations. Automated storage and retrieval systems (AS/RS) generally include computer controlled systems of automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

In these traditional systems, the totes are brought to a person, and the person may either remove an item from the tote or add an item to the tote. The tote is then returned to the storage location. Such systems, for example, may be used in libraries and warehouse storage facilities. The AS/RS involves no processing of the items in the tote, as a person processes the objects when the tote is brought to the person. This separation of jobs allows any automated transport system to do what it is good at—moving totes—and the person to do what the person is better at—picking items out of cluttered totes. It also means the person may stand in one place while the transport system brings the person totes, which increases the rate at which the person can pick goods.

There are limits however, on such conventional systems in terms of the time and resources required to move totes toward and then away from each person, as well as how quickly a person can process totes in this fashion in applications where each person may be required to process a large number of totes. There remains a need therefore, for an AS/RS that stores and retrieves objects more efficiently and cost effectively, yet also assists in the processing of a wide variety of objects.

SUMMARY

In accordance with an aspect, the invention provides a storage, retrieval and processing system for processing objects including: a plurality of bins including objects to be distributed, the plurality of bins being provided on an input conveyance system, an articulated arm that includes an end effector for grasping and moving any of the objects, the articulated arm being capable of reaching any of the objects within at least one of the plurality of bins in an input area of the conveyance system, a drop perception unit for providing perception data regarding a selected object that is presented to the drop perception unit by the articulated arm, and a routing conveyance system for receiving the selected object, and for moving the selected object in each of horizontal and vertical directions toward a selected destination container responsive to the perception data, the routing conveyance system including at least one object conveyor for urging the selected object toward the selected destination container in a third direction that is generally orthogonal to the horizontal and vertical directions.

In accordance with another aspect, the invention provides a storage, retrieval and processing system for processing objects that includes: a plurality of bins including objects to be distributed, the plurality of bins being provided on an input conveyance system, an articulated arm that includes an end effector for grasping and moving any of the objects, the articulated arm being capable of reaching any of the objects within at least one of the plurality of bins in an input area of the input conveyance system, and a routing conveyance system including an object conveyor for receiving the selected object, and for moving the selected object from the input area in each of routing horizontal and vertical directions toward a destination container using one of at least two grid conveyances, the grid conveyances being adapted to travel along the horizontal and vertical directions and to avoid colliding with one another by generally traveling in similar circuits, one of which is time delayed with respect to the other.

In accordance with a further aspect, the invention provides a method of providing storage, retrieval and processing of objects including: providing on a conveyance system a plurality of bins including objects to be distributed, grasping and moving objects within at least one of the plurality of bins in an input area of the conveyance system using an articulated arm that includes an end effector for grasping and moving any of the objects, the articulated arm being capable of reaching any of the objects within at least one of the plurality of bins in an input area of the conveyance system, providing perception data regarding a selected object that is presented to the drop perception unit by the articulated arm; routing the selected object in each of horizontal and vertical directions toward a selected destination container responsive to the perception data using a first object conveyor, and urging the selected object toward the selected conveyor in a third direction that is generally orthogonal to the horizontal and vertical directions.

BRIEF DESCRIPTION OF THE DRAWINGS

The following description may be further understood with reference to the accompanying drawings in which.

The drawings are shown for illustrative purposes only.

DETAILED DESCRIPTION

Figure 2:
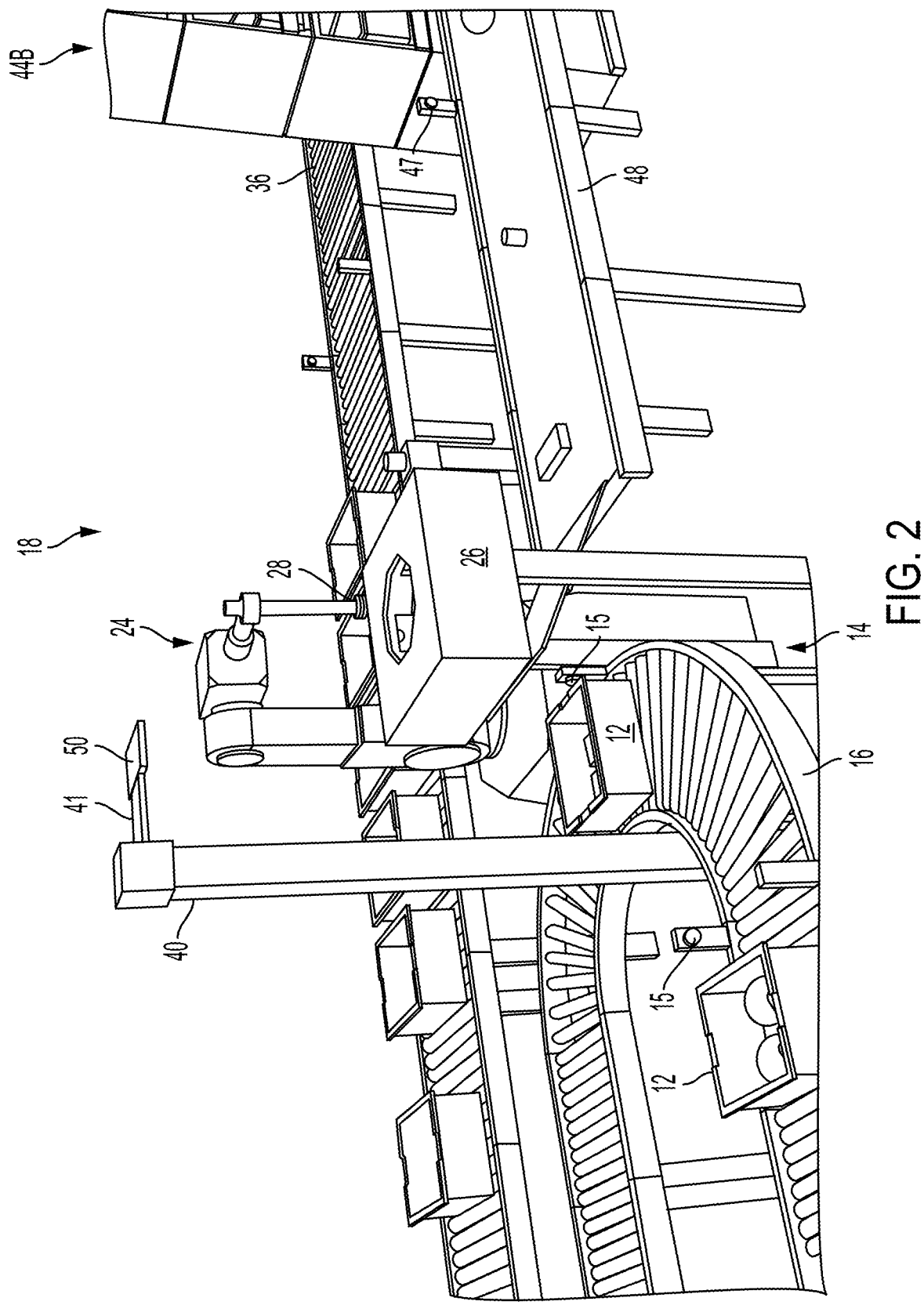
FIG. 2 shows an illustrative diagrammatic enlarged view of an intake portion of the system of FIG. 1.

In accordance with an aspect, the invention provides an ASRS system 10 in which objects are provided in a plurality of bins 12 at an input area 14 of an input conveyance system 16. Objects are processed at a processing station 18, then routed via a routing conveyance system 20 to any of a plurality of destination containers at a destination area 22. The processing station 18 may include an articulated arm 24, a bin perception unit 50 and drop perception unit 26. Generally, objects are provided to the input area 14 in bins 12, are moved by an articulated arm 24 to the drop perception unit 26, fall to an object feed conveyor 48, and are routed to any of a plurality of destination containers any of one or more container arrays 44A, 44B. Empty containers are provided to each container array 44A, 44B, and completed containers are removed from each container array, by a container movement system adjacent either of output conveyors 34, 36. With reference to FIG. 2, the input conveyor 16 may include a plurality of detectors 15 that monitor movement of the conveyors, and may confirm the identity and positon of a conveyor at the input area 14 for processing at the processing station 18.

Figure 1:
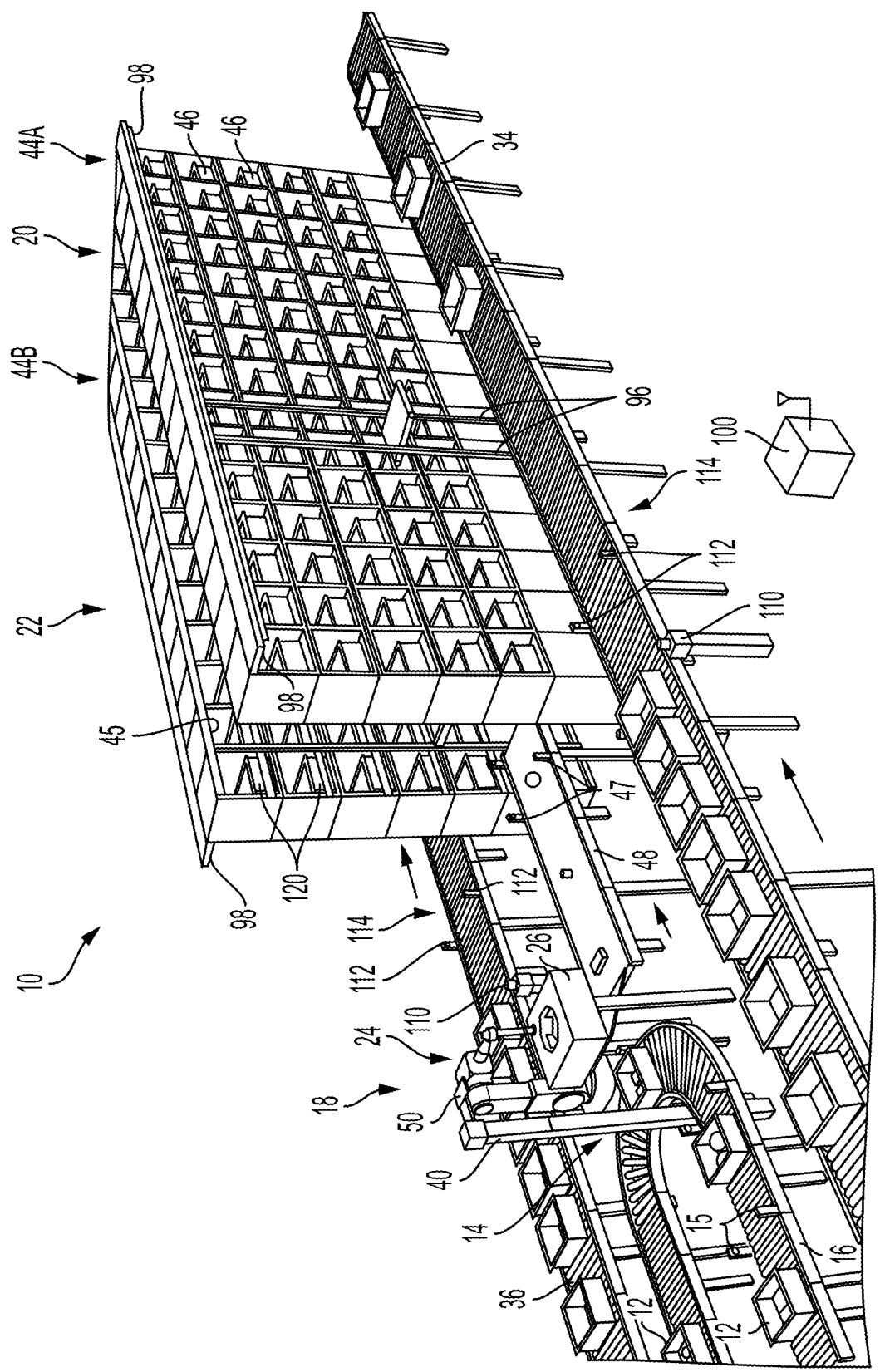
FIG. 1 shows an illustrative diagrammatic front isometric view of a storage, retrieval and processing system in accordance with an aspect of the present invention.

The operations of the system are coordinated with a central control system 100 as shown in FIG. 1 that communicates wirelessly with each of the conveyors 16, 48, and 114 and conveyor sensors 15, 47, and 112, the articulated arm 24, the drop perception unit 26 and the bin perception unit 50, as well as all elements of the routing conveyance system, container arrays, container movement systems, and output conveyance systems (all components and systems). The bin perception unit 50 aids in grasping objects from the bins 12 with an end effector of the articulated arm. Once grasped by the articulated arm, the object is dropped into the drop perception unit 26, and the system thereby determines from symbol strings the UPC associated with the object, as well as the outbound destination for each object. The central control system 100 is comprised of one or more workstations or central processing units (CPUs). For example, the correspondence between UPCs or mailing labels, and outbound destinations is maintained by a central control system in a database called a manifest. The central control system maintains the manifest by communicating with a warehouse management system (WMS). The manifest provides the outbound destination for each in-bound object.

Figure 3:
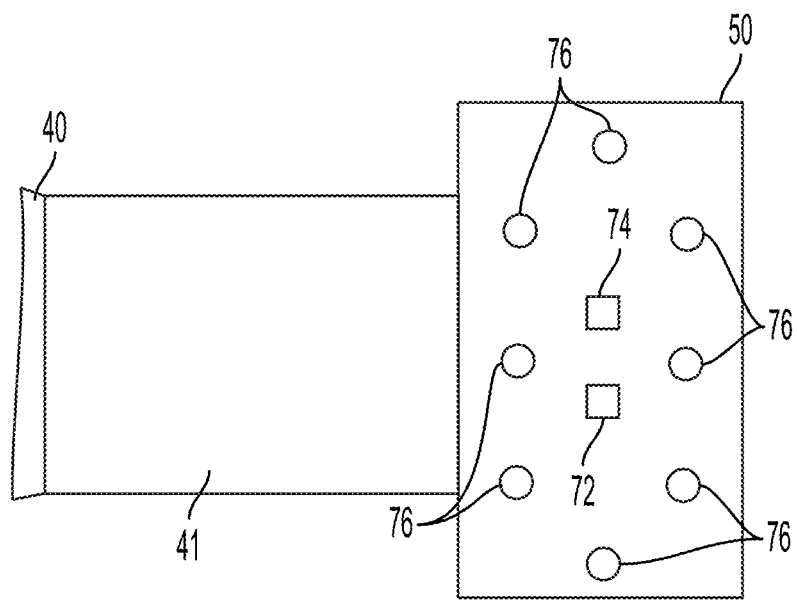
FIG. 3 shows an illustrative diagrammatic underside view of the bin perception unit of FIGS. 1 and 2.

In particular, the system of an aspect includes a bin perception unit 50 that is mounted above a bin of objects to be processed next to the articulated arm 24, looking down into a bin 12. The bin perception unit 50, for example and as shown in FIG. 3, may be attached via a mount 41 to a perception unit stand 40, and may include (on the underside thereof), a camera 72, a depth sensor 74 and lights 76. A combination of 2D and 3D (depth) data is acquired. The depth sensor 74 may provide depth information that may be used together with the camera image data to determine depth information regarding the various objects in view. The lights 76 may be used to remove shadows and to facilitate the identification of edges of objects, and may be all on during use, or may be illuminated in accordance with a desired sequence to assist in object identification. The system uses this imagery and a variety of algorithms to generate a set of candidate grasp locations for the objects in the bin as discussed in more detail below.

Figure 4:
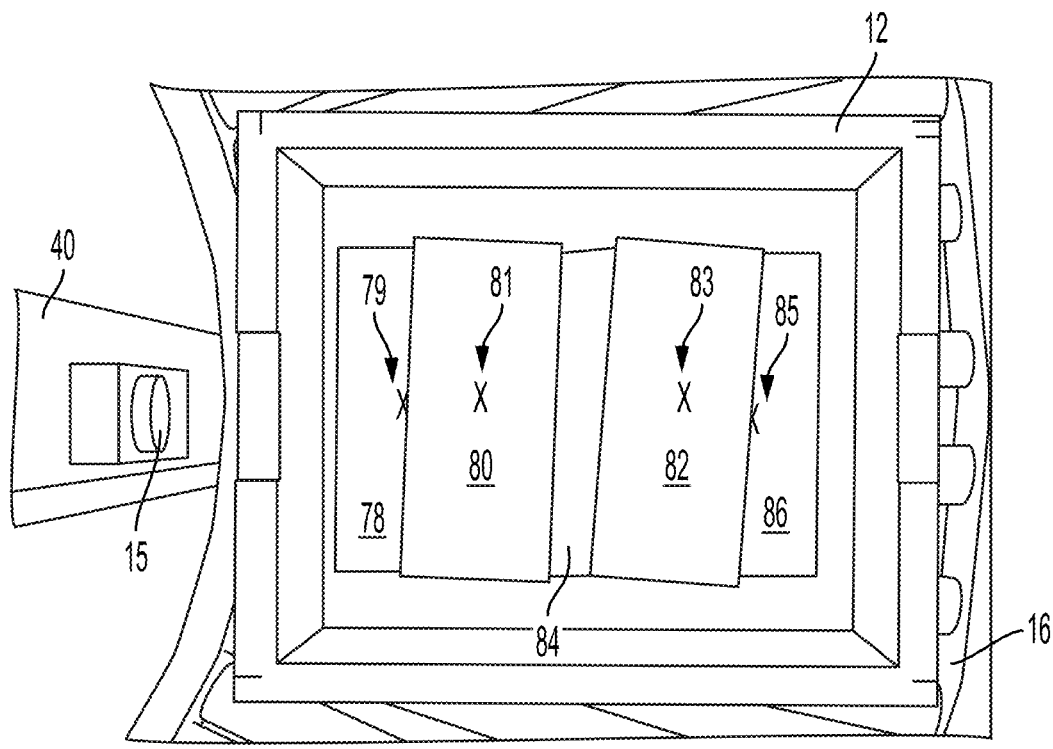
FIG. 4 shows an illustrative diagrammatic view from the bin perception unit of FIG. 3 directed a bin and its contents.

FIG. 4 shows an image view from the bin perception unit 50. The image view shows a bin 12 in the input area 14 (a conveyor), and the bin 12 contains objects 78, 80, 82, 84 and 86. In the present embodiment, the objects are homogenous, and are intended for distribution to different break-pack packages. Superimposed on the objects 78, 80, 82, 84, 86 (for illustrative purposes) are anticipated grasp locations 79, 81, 83 and 85 of the objects. Note that while candidate grasp locations 79, 83 and 85 appear to be good grasp locations, grasp locations 79, 85 do not because each associated object is at least partially underneath another object. The system may also not even try to yet identify a grasp location for the object 84 because the object 84 is too obscured by other objects. Candidate grasp locations may be indicated using a 3D model of the robot end effector placed in the location where the actual end effector would go to use as a grasp location. Grasp locations may be considered good, for example, if they are close to the center of mass of the object to provide greater stability during grasp and transport, and/or if they avoid places on an object such as caps, seams, etc. where a good vacuum seal might not be available.

Figure 5:
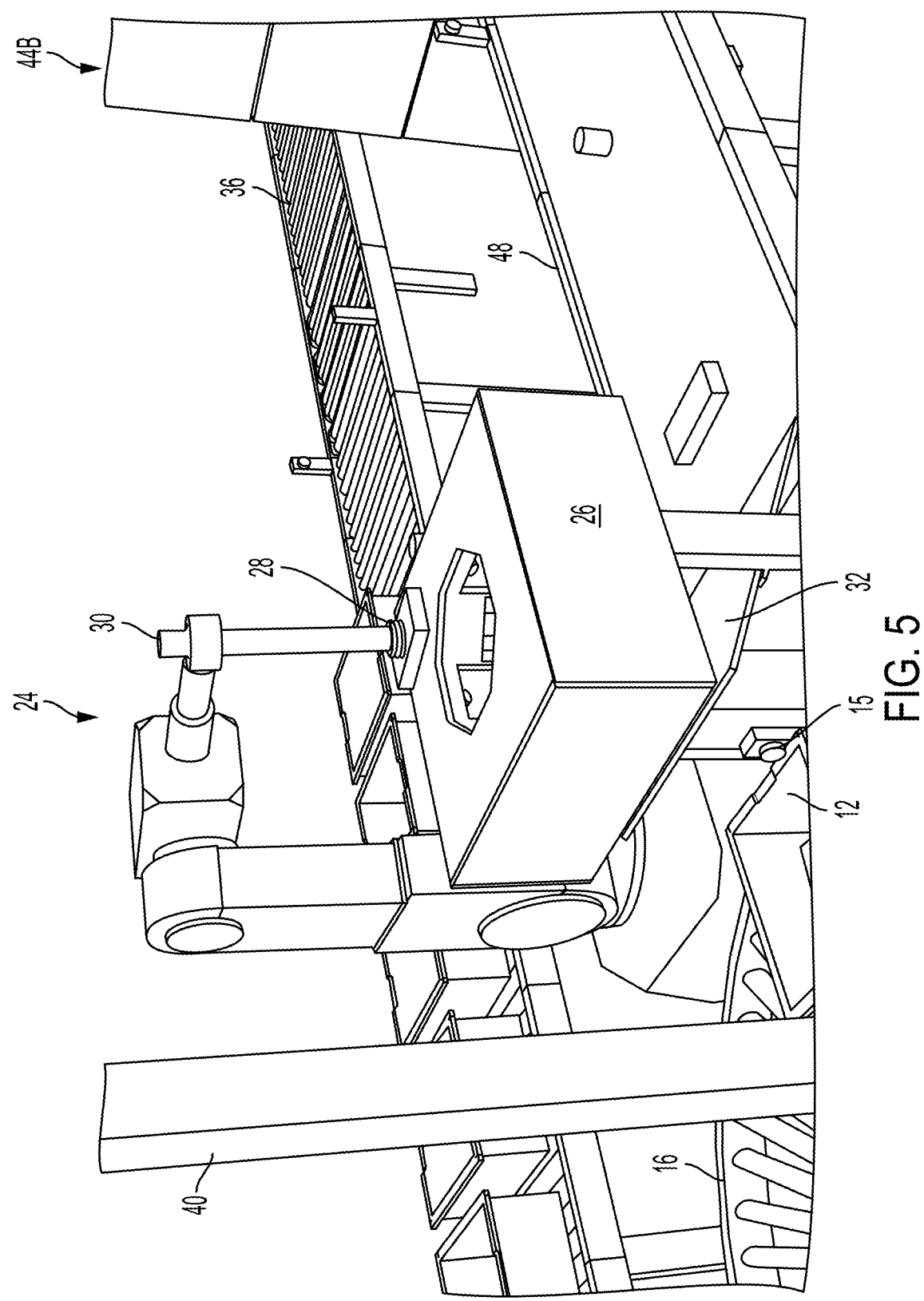
FIG. 5 shows an illustrative diagrammatic enlarged view of the object perception unit of the system of FIG. 1.
Figure 6:
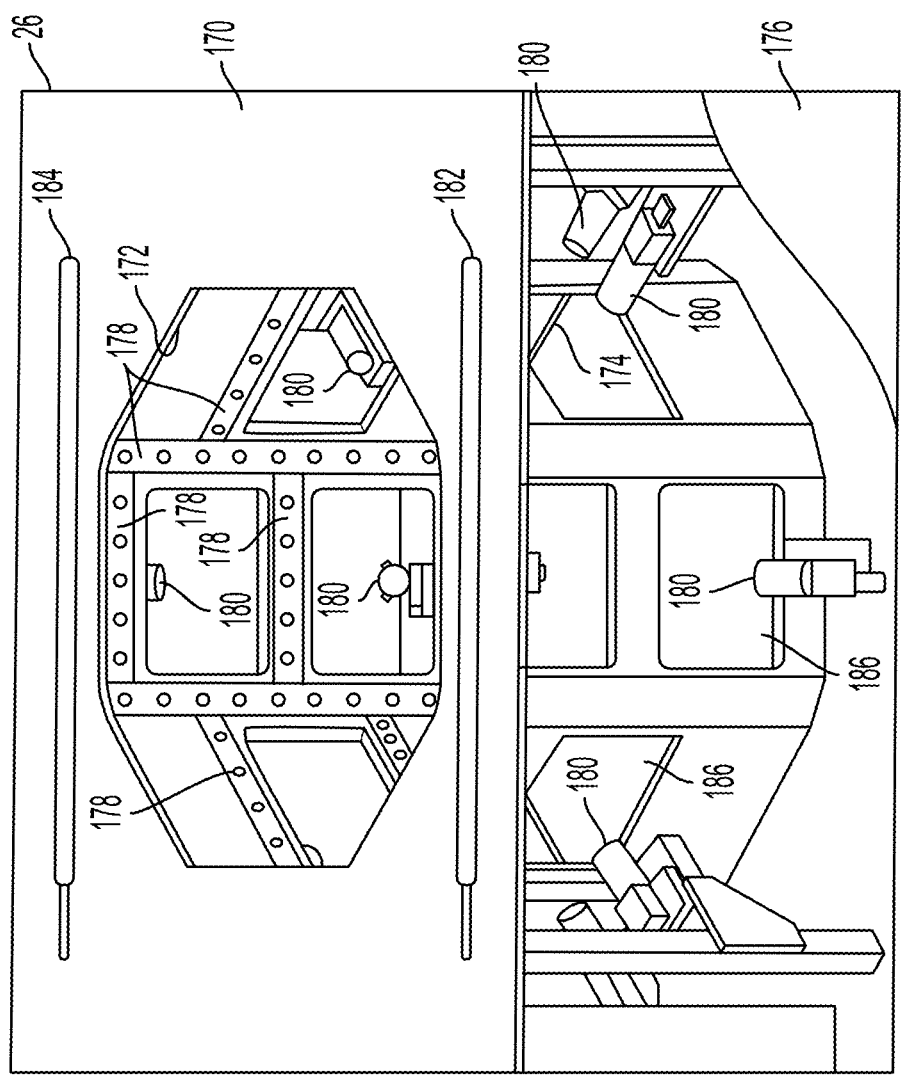
FIG. 6 shows an illustrative diagrammatic front elevated view of the object perception unit of FIGS. 1 and 5.
Figure 7:
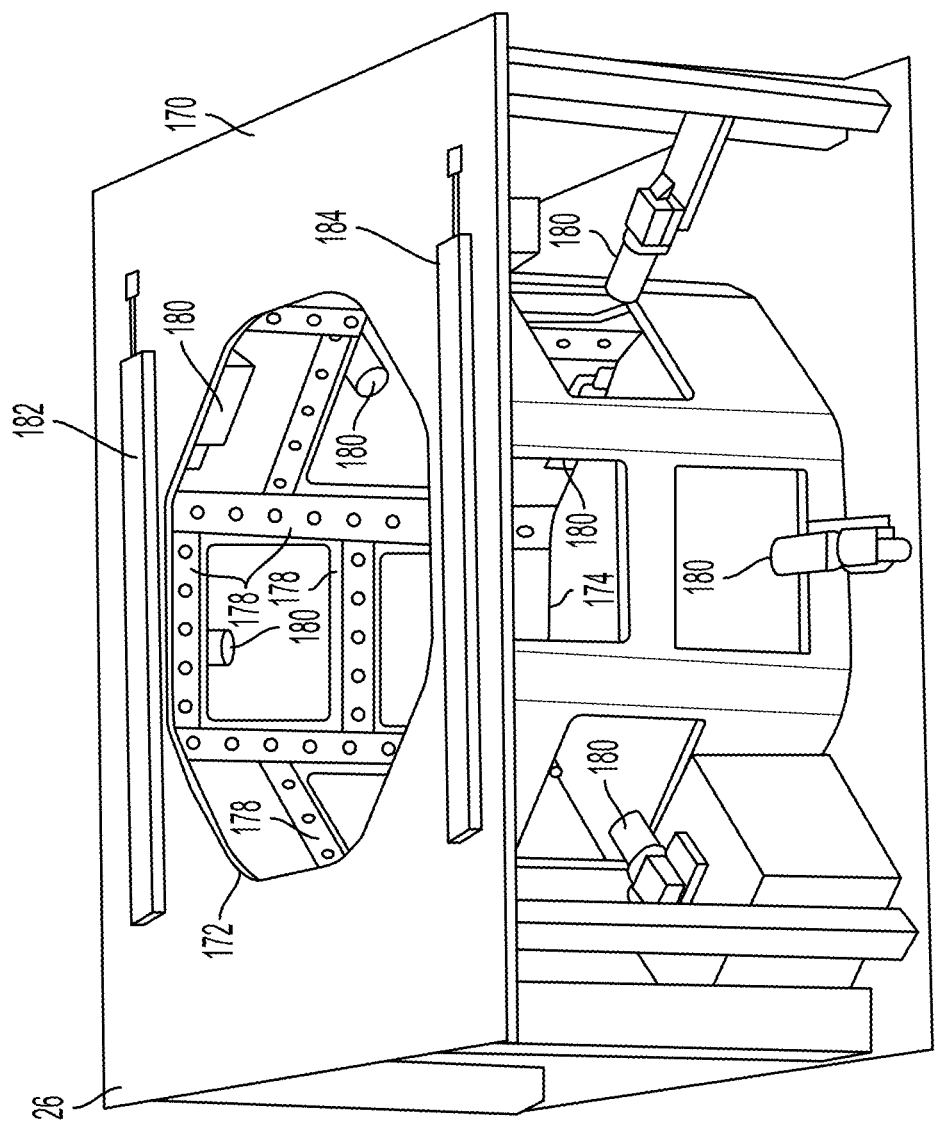
FIG. 7 shows an illustrative diagrammatic rear elevated view of the object perception unit of FIGS. 1 and 5.

With reference to FIG. 5, the articulated arm 24 includes an end effector 28 that is coupled via a hose mount 30 to a vacuum hose attached to a vacuum source. With further reference to FIGS. 6 and 7, the drop perception unit 26 includes a structure 170 having a top opening 172 and a bottom opening 174, and the walls may be covered by an enclosing material 176 (e.g., a colored covering such as orange plastic, to protect humans from potentially dangerously bright lights within the drop perception unit 26) as shown in FIGS. 5 and 6. The structure 170 includes a plurality of rows of sources (e.g., illumination sources such as LEDs) 178 as well as a plurality of image perception units (e.g., cameras) 180. The sources 178 are provided in rows, and each is directed toward the center of the opening. The perception units 180 are also generally directed toward the opening, although some cameras are directed horizontally, while others are directed upward, and some are directed downward. The system also includes an entry source (e.g., infrared source) 182 as well as an entry detector (e.g., infrared detector) 184 for detecting when an object has entered the drop perception unit 26. The LEDs and cameras therefore encircle the inside of the structure 170, and the cameras are positioned to view the interior via windows that may include a glass or plastic covering (e.g., 186).

An important aspect of systems of certain embodiments of the present invention, is the ability to identify via barcode or other visual markings of objects, unique indicia associated with the object by employing a drop perception unit into which objects may be dropped. Automated scanning systems would be unable to see barcodes on objects that are presented in a way that their barcodes are not exposed or visible. The drop perception unit may be used in certain embodiments, with a robotic system that may include a robotic arm equipped with sensors and computing, that when combined is assumed herein to exhibit the following capabilities: (a) it is able to pick objects up from a specified class of objects, and separate them from a stream of heterogeneous objects, whether they are jumbled in a bin, or are singulated on a motorized or gravity conveyor system; (b) it is able to move the object to arbitrary places within its workspace; (c) it is able to place objects in an outgoing bin or shelf location in its workspace; and, (d) it is able to generate a map of objects that it is able to pick, represented as a candidate set of grasp points in the workcell, and as a list of polytopes enclosing the object in space.

The allowable objects are determined by the capabilities of the robotic system. Their size, weight and geometry are assumed to be such that the robotic system is able to pick, move and place them. These may be any kind of ordered goods, packages, parcels, or other articles that benefit from automated sorting. Each object is associated with unique indicia such as a unique code (e.g., barcode) or a unique destination (e.g., address) of the object.

The manner in which inbound objects arrive may be for example, in one of two configurations: (a) inbound objects arrive piled in bins of heterogeneous objects; or (b) inbound articles arrive by a moving conveyor. The collection of objects includes some that have exposed bar codes and other objects that do not have exposed bar codes. The robotic system is assumed to be able to pick items from the bin or conveyor. The stream of inbound objects is the sequence of objects as they are unloaded either from the bin or the conveyor. With reference to FIG. 5, after an object has been dropped through the drop perception unit 26, it is guided by a guide chute 32 onto the routing conveyance system 20.

The manner in which outbound objects are organized is such that objects are placed in a bin, shelf location or container, into which all objects corresponding to a given order are consolidated. These outbound destinations may be arranged in vertical arrays, horizontal arrays, grids, or some other regular or irregular manner, but which arrangement is known to the system. The robotic pick and place system is assumed to be able to place objects into all of the outbound destinations, and the correct outbound destination is determined from unique identifying indicia (identify or destination, such as a bar code or a unique address), which identifies the object or its destination.

It is assumed that the objects are marked in one or more places on their exterior with a visually distinctive mark such as a barcode or radio-frequency identification (RFID) tag so that they may be identified with a scanner. The type of marking depends on the type of scanning system used, but may include 1D or 2D barcode symbologies. Multiple symbologies or labeling approaches may be employed. The types of scanners employed are assumed to be compatible with the marking approach. The marking, either by barcode, RFID tag, or other means, encodes a symbol string, which is typically a string of letters and numbers. The symbol string uniquely associates the object with unique identifying indicia (identity or destination).

The operations of the systems described herein are coordinated by the central control system 100 as shown in FIG. 1. This system determines from symbol strings the unique indicia associated with an object, as well as the outbound destination for the object. The central control system is comprised of one or more workstations or central processing units (CPUs). The correspondence between unique identifying indicia and outbound destinations is maintained by the central control system in a database called a manifest. The central control system maintains the manifest by communicating with a warehouse management system (WMS).

With reference to FIGS. 8A-8D, the routing conveyance system receives objects (e.g., a singulated stream of objects) from the object feed conveyor 48. The routing conveyance system includes one or more routing conveyor units 38A, 38B, each of which includes an object conveyor 37 mounted on a frame 39. Each frame 39 is movably coupled to routing vertical rails 43, the upper and lower ends of each of which are movably coupled to routing vertical rails 45 (also shown in FIG. 1). In accordance with various aspects, the rail systems may be reversed, providing the routing horizontal rails 45 mounted to the routing vertical rails 43.

Each routing conveyor unit 38A, 38B is adapted to receive a selected object on its object conveyor 37, which is mounted on the frame 39 that travels along the track system 43, 45 in both vertical and horizontal directions between the at least two vertically stacked arrays 44A, 44B of destination containers 46 (e.g., bins, totes, boxes, etc.). The selected object (e.g., 41) is received by the object conveyor 37 from the object feed conveyor 48 of the conveyance system, and brings the object toward a selected destination container among the vertically stacked arrays 44A, 44B. After routing the selected object to the selected destination location, the routing conveyor unit is returned to the object feed conveyor 48 to receive a new object 49. Routing conveyor units 38A, 38B are programmed to avoid each other, for example, by generally moving at different elevations when passing one another.

Figure 8A:
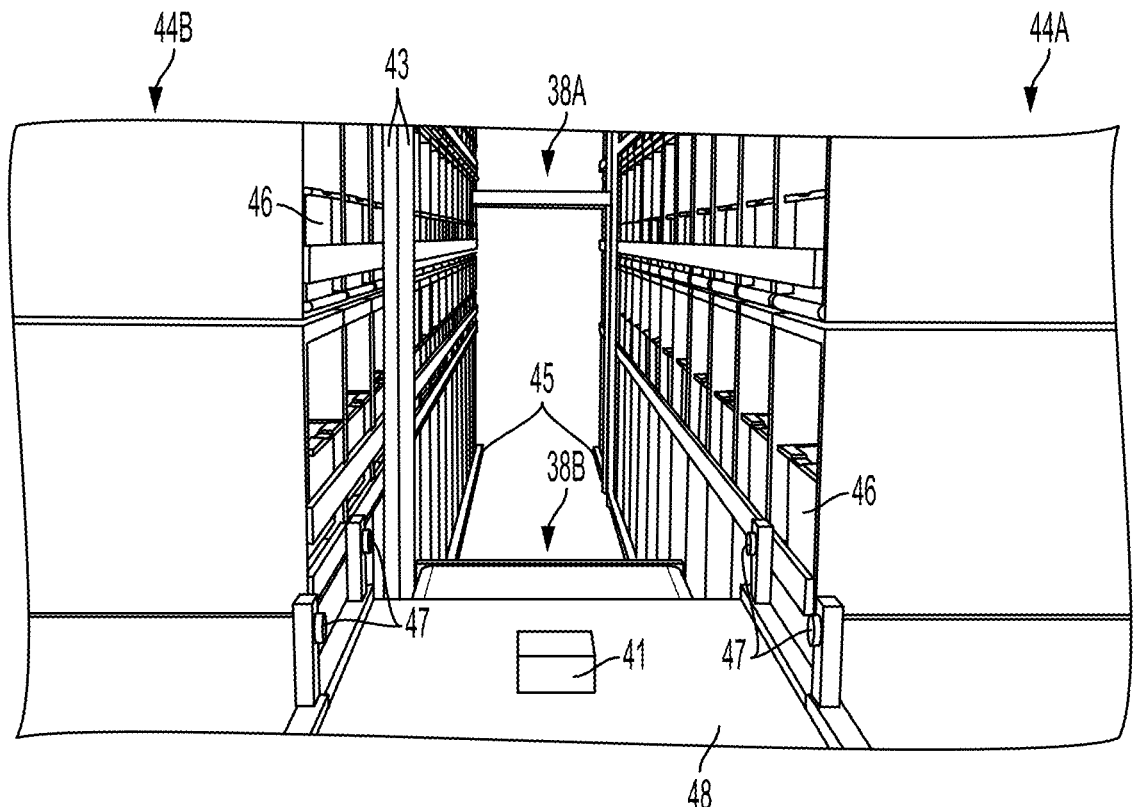
FIGS. 8A-8D show illustrative diagrammatic views of an object being moved in the object routing conveyance system of FIG. 1.
Figure 8B:
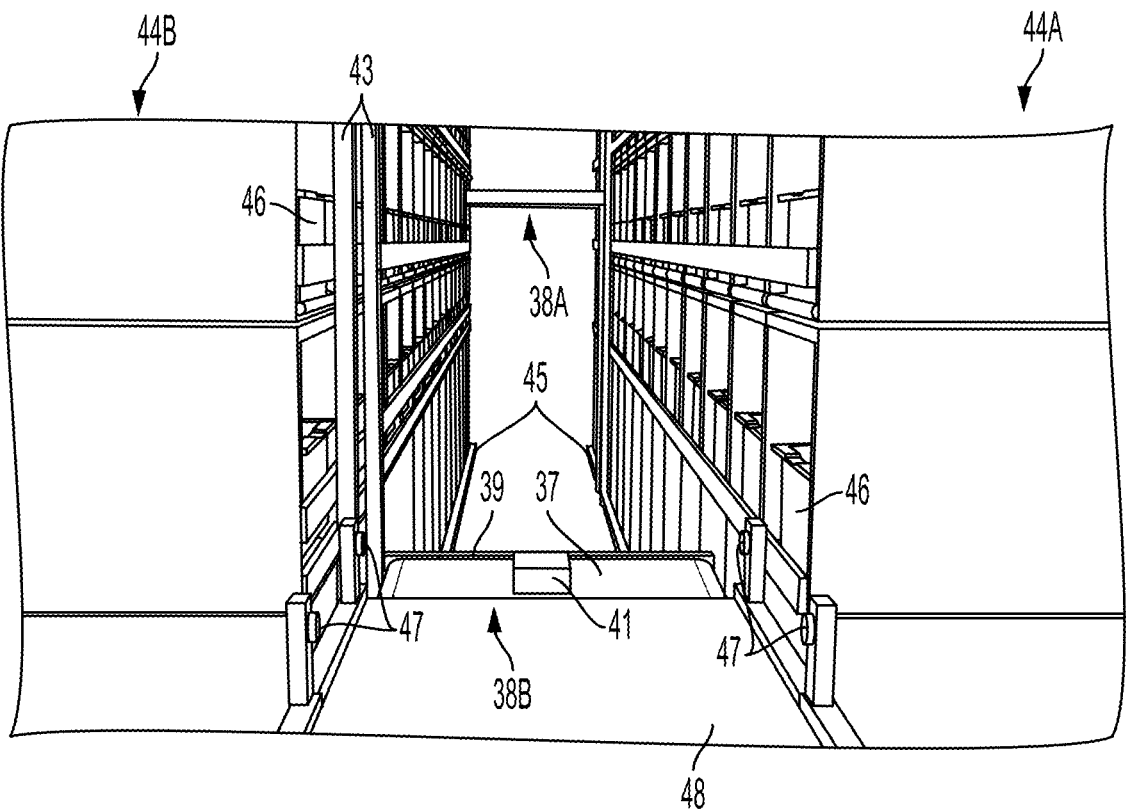
Figure 8C:
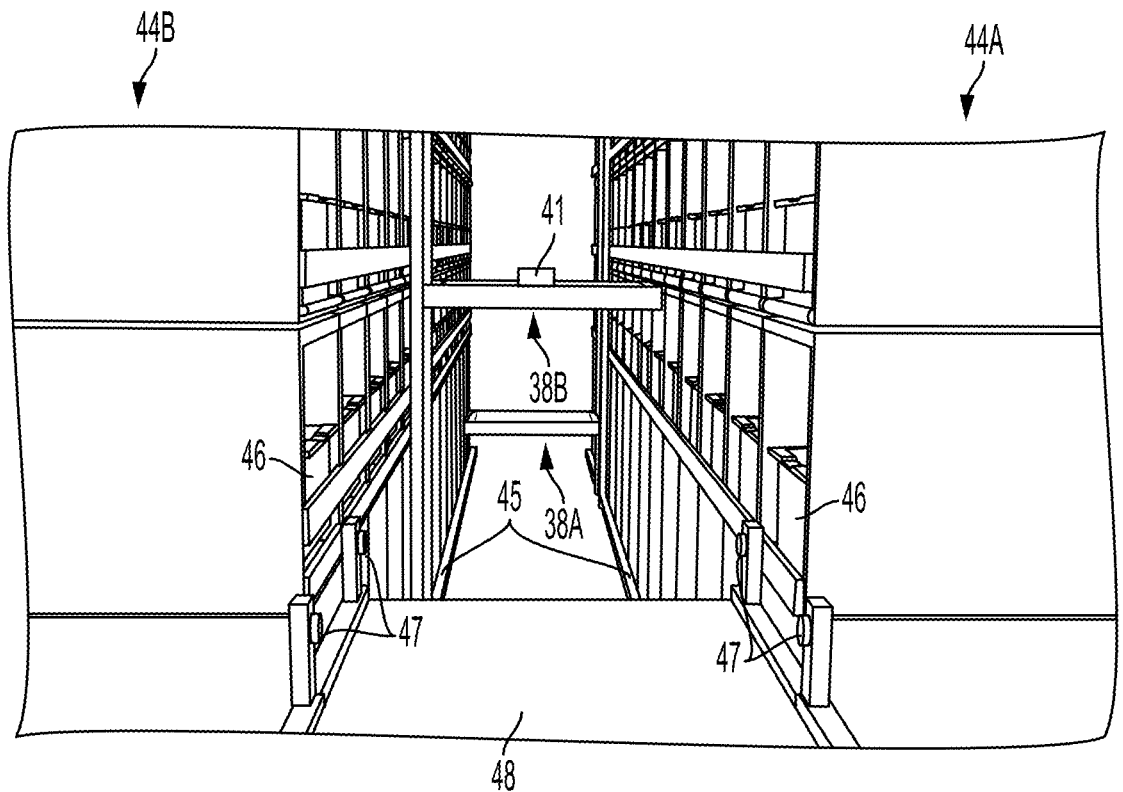
Figure 8D:
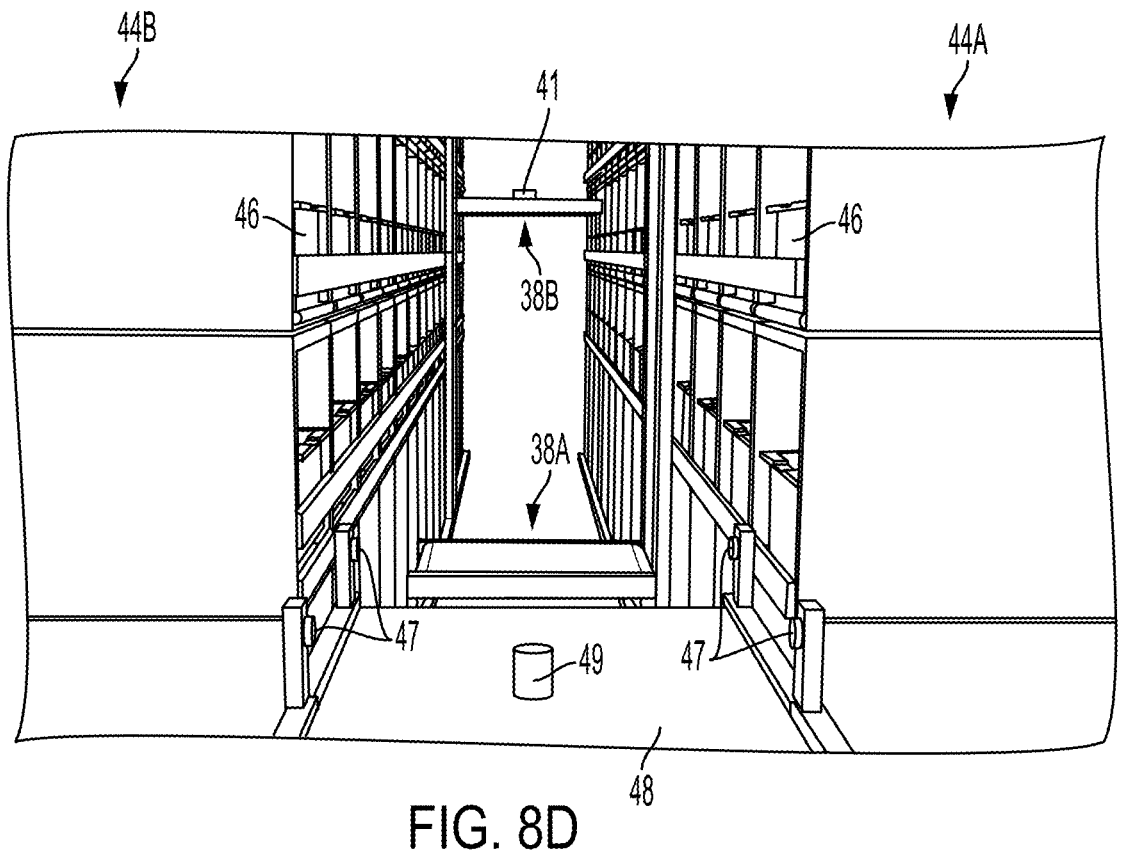

In particular, with reference to FIG. 8A, while routing conveyor unit 38B approaches the object feed conveyor 48 from an elevation below the object feed conveyor 48, routing conveyor 38B may be destined for or located at a container at relatively high elevation. Once the routing conveyor unit 38B receives the object 41 (as shown in FIG. 8B), the system will begin to move the object toward its destination container (e.g., as assigned by a WMS system). If the destination container is located at a higher elevation, the routing conveyor unit 38B will begin to rise and move away from the object feed conveyor 48, while also moving the routing conveyor unit 38A downward and toward the object feed conveyor 48 (as shown in FIG. 8C). When the routing conveyor unit 38B reaches the selected destination container, the routing conveyor unit 38A approaches the object feed conveyor from below (as shown in FIG. 8D). If the assigned destination container is relatively low in on or the other of the stacked arrays 44A, 44B, the returning routing conveyor unit will travel a relatively high path back to the object feed conveyor. Each routing conveyor unit 38A, 38B is coupled via the routing vertical rails 43 and the routing horizontal rails 45 to one of the two vertically stacked arrays, but they avoid colliding by having the returning unit follow a vertically opposite path than a path to be taken by the other routing conveyor unit in bringing a new object 49 to a selected destination bin. Each routing conveyor unit 38A, 38B may move an object into a destination bin located in either vertically stacked array 44A, 44B (to either side if the routing conveyor unit 38A, 38B).

Figure 9A:
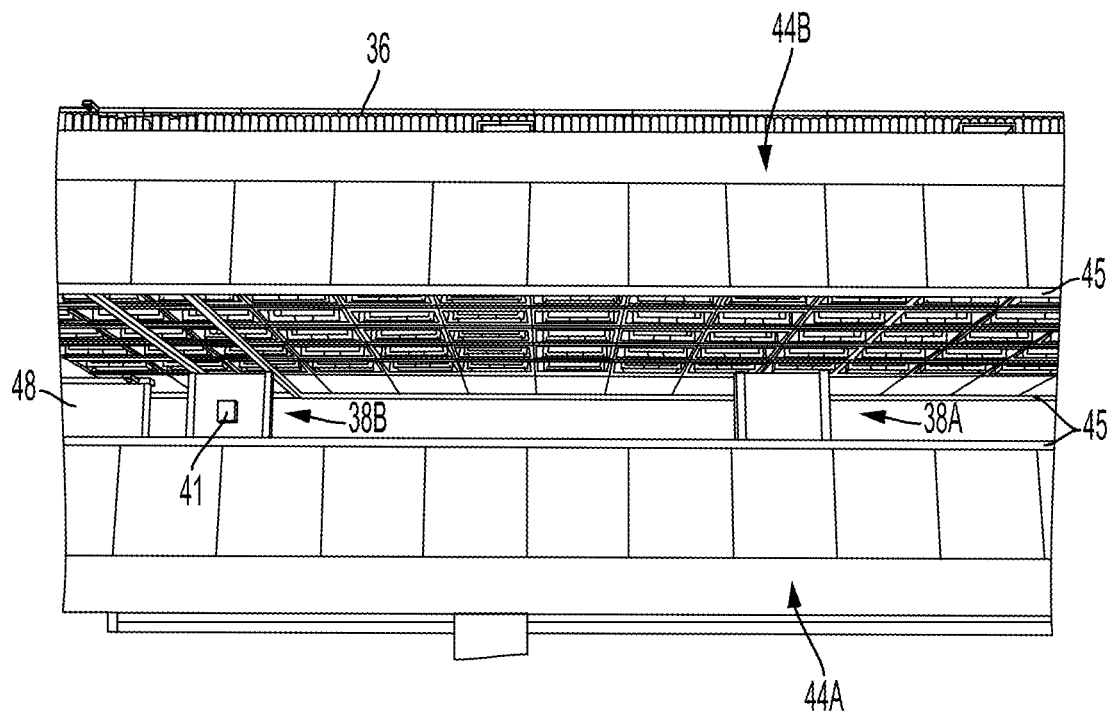
FIGS. 9A-9C show illustrative diagrammatic views of movement of object conveyors in the object routing conveyance system of FIG. 1.
Figure 9B:
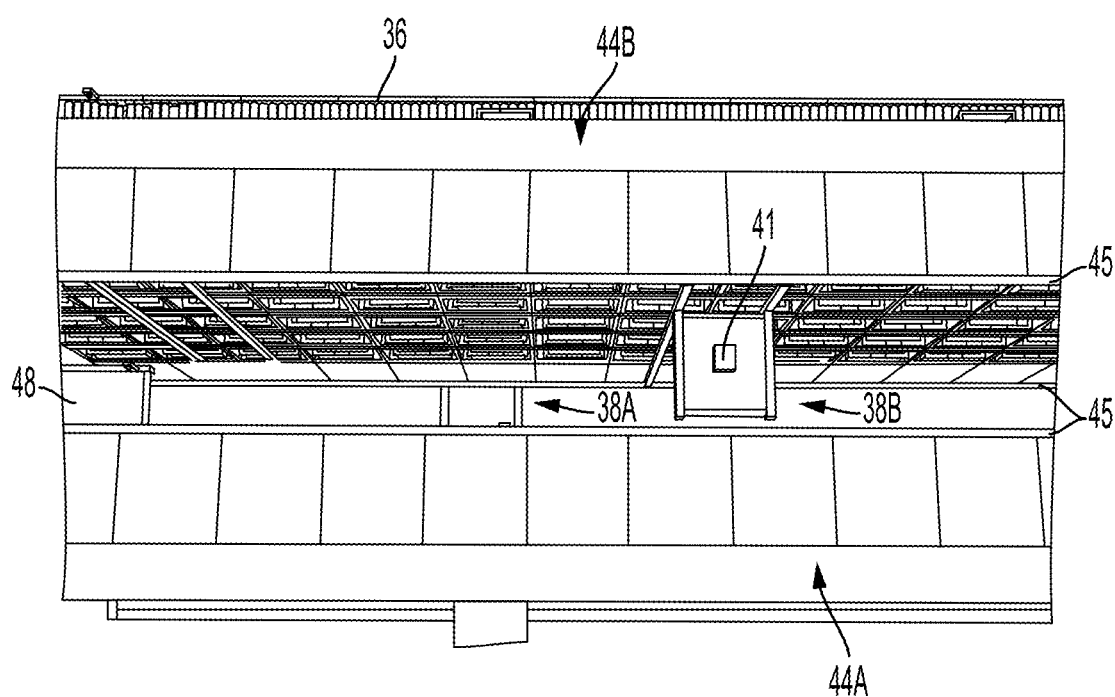
Figure 9C:
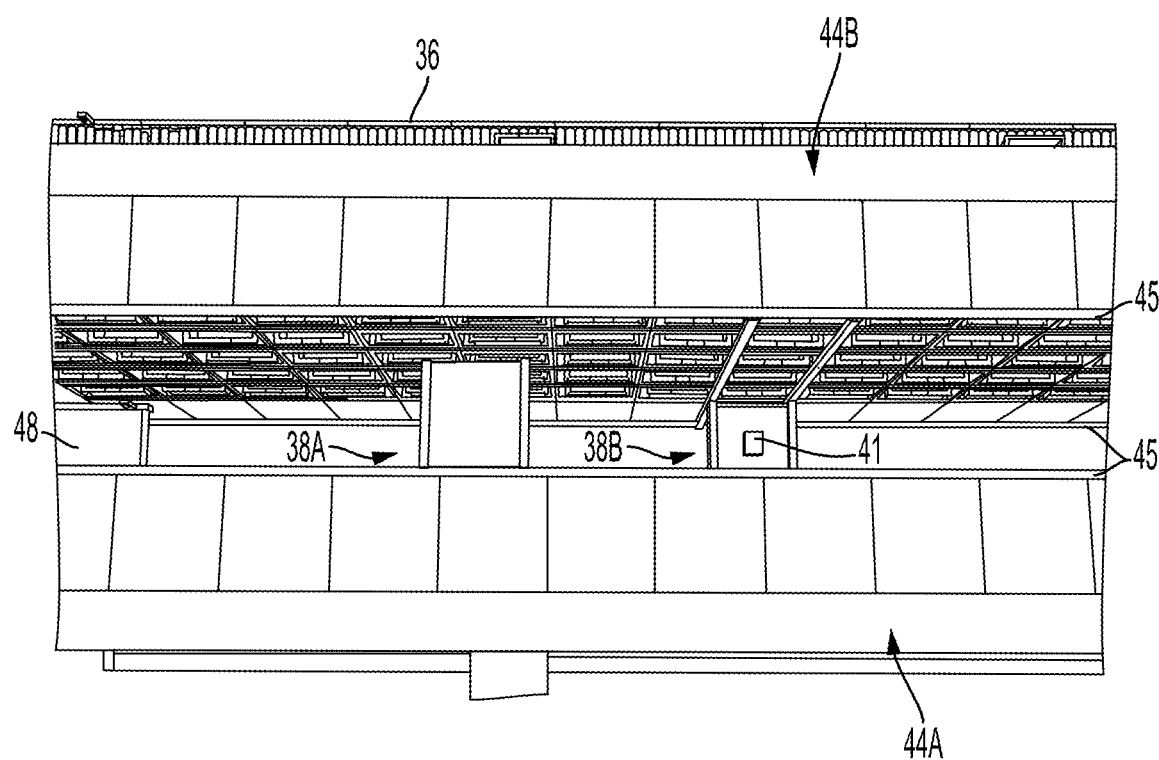

With reference to FIG. 9A, when a newly loaded routing conveyor unit (e.g., 38B) carrying an object 41 is assigned a selected destination container, the system determines whether the selected destination container is located at an upper elevation or a lower elevation (all locations are assigned to be one or the other). If the destination location is located at an upper elevation, the returning routing conveyor unit 38A moves at a lower elevation back to the object feed conveyor 48 (as shown in FIG. 9B). If, on the other hand, the destination location is located at a lower elevation, the returning routing conveyor unit 38A moves at an upper elevation back to the object feed conveyor 48 (as shown in FIG. 9C).

The system therefore provides objects to either of two adjacent vertically stacked arrays of destination containers, wherein at least two routing conveyor units are used to move objects from a loading location (at conveyor 48) to any destination container in either of the arrays 44. The routing conveyor units are moved such that one returns to the loading location while the other is delivering an object, and the returning unit moves vertically opposite the delivering unit. For example, if the delivering unit is moving to a location in the upper half of either of the arrays 44, then the returning unit is moved in the lower half of the area between the arrays. Conversely if the delivering unit is moving to a location in the lower half of either of the arrays 44, then the returning unit is moved in the upper half of the area between the arrays. In this way, the routing conveyor units 38A, 38B avoid colliding. Each of the objects is therefore moved vertically and horizontally by a routing conveyor unit, and then moved in a third direction by the container conveyor wherein the third direction is generally orthogonal to the first and second directions. The container may later be removed from the open storage location also along the third direction when completed as discussed in more detail below, and then moved horizontally and vertically for removal to an output conveyor.

Figure 10A:
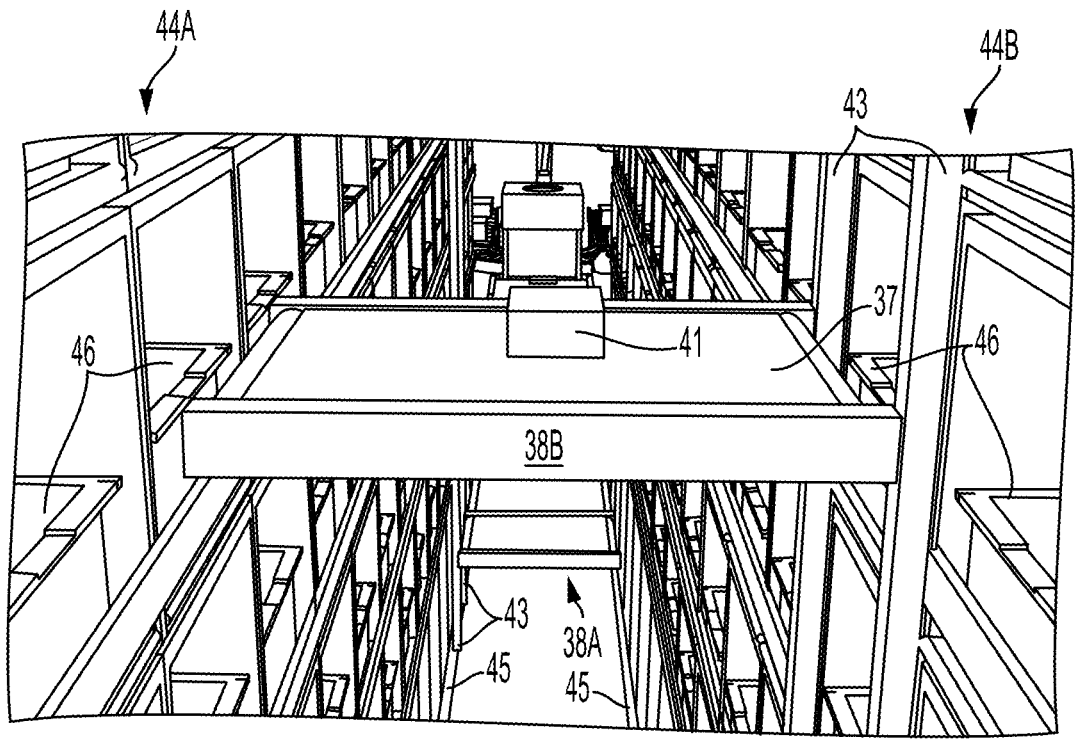
FIGS. 10A-10C show illustrative diagrammatic views of an object being moved to a destination container in the system of FIG. 1.
Figure 10B:
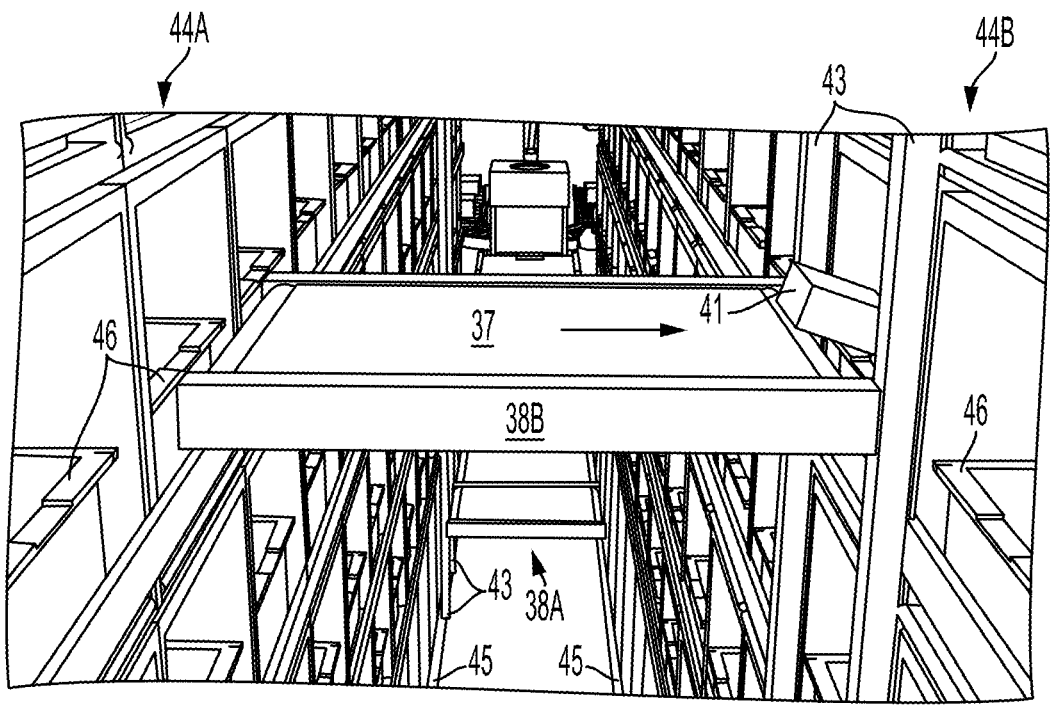
Figure 10C:
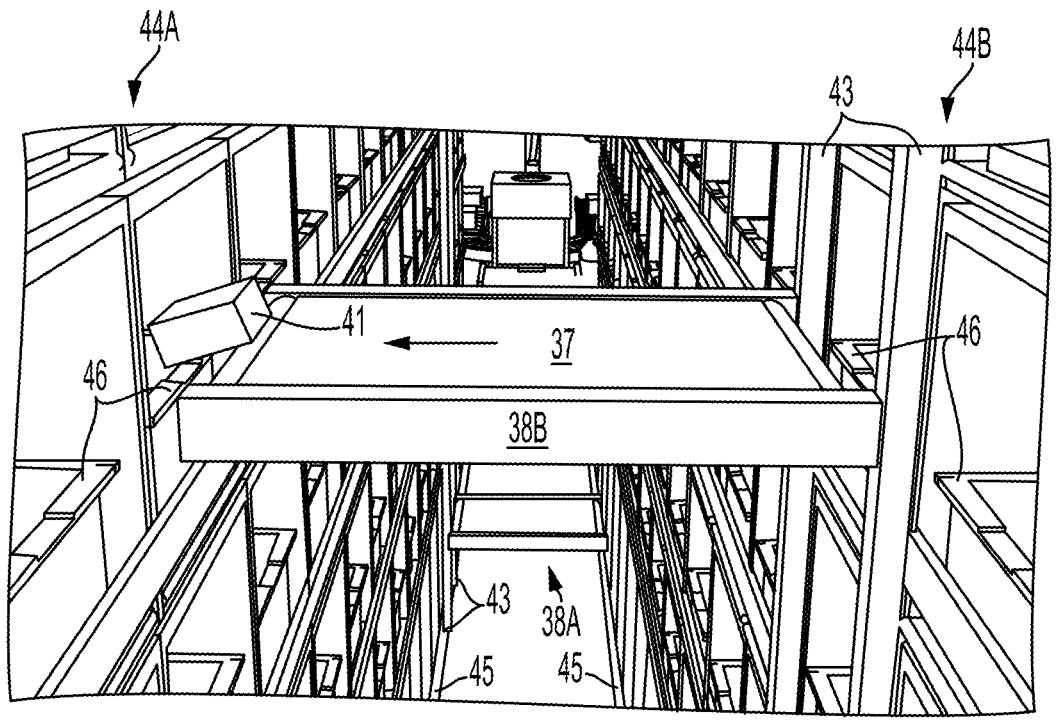

FIG. 10A shows the routing conveyor unit 38B at a destination position with a selected object 41 on its object conveyor 37. If the selected destination container is within the vertically stacked array 44B, the conveyor 37 moves to urge the object into the destination container therein (as shown in FIG. 10B), and of the selected destination container is within the vertically stacked array 44A, the conveyor 37 moves to urge the object into the destination container therein (as shown in FIG. 10C). Each routing conveyor unit 38A, 38B may thereby provide an object thereon to any destination container within either vertically stacked array 44A, 44B. Destination containers 46 in the vertically stacked arrays 44A, 44B of destination containers are thereby populated with objects from the input bins 12 via the processing station 18 and the routing conveyance system at a destination area 22.

When a destination container is full or otherwise finished being processed, the completed destination container 52 may be drawn from the outside of the respective vertically stacked array 44A, 44B, and moved to an associated output conveyor 34, 36. The outside of each array is opposite the inside adjacent the routing conveyor units. Each of the destination bins 46 in the arrays 44A, 44B is positioned within an open storage location 54, and each open storage location 54 includes a storage conveyor 56 that supports (and may move) each associated destination conveyor. A container movement system associated with each array 44A, 44B cooperates with each storage conveyor 56 to move containers to and from each array. The container movement system includes a container movement unit 90 that includes a container conveyor 92 mounted on a structure 94 that is movable vertically along container movement vertical rails 96. The ends of the container movement vertical rails 96 are mounted on and horizontally along container movement horizontal rails 98 (shown in FIGS. 1 and 15). Again, in accordance with various aspects, the rail system may be reversed, providing the container movement horizontal rails 96 mounted to the container movement vertical rails 98.

Figure 11A:
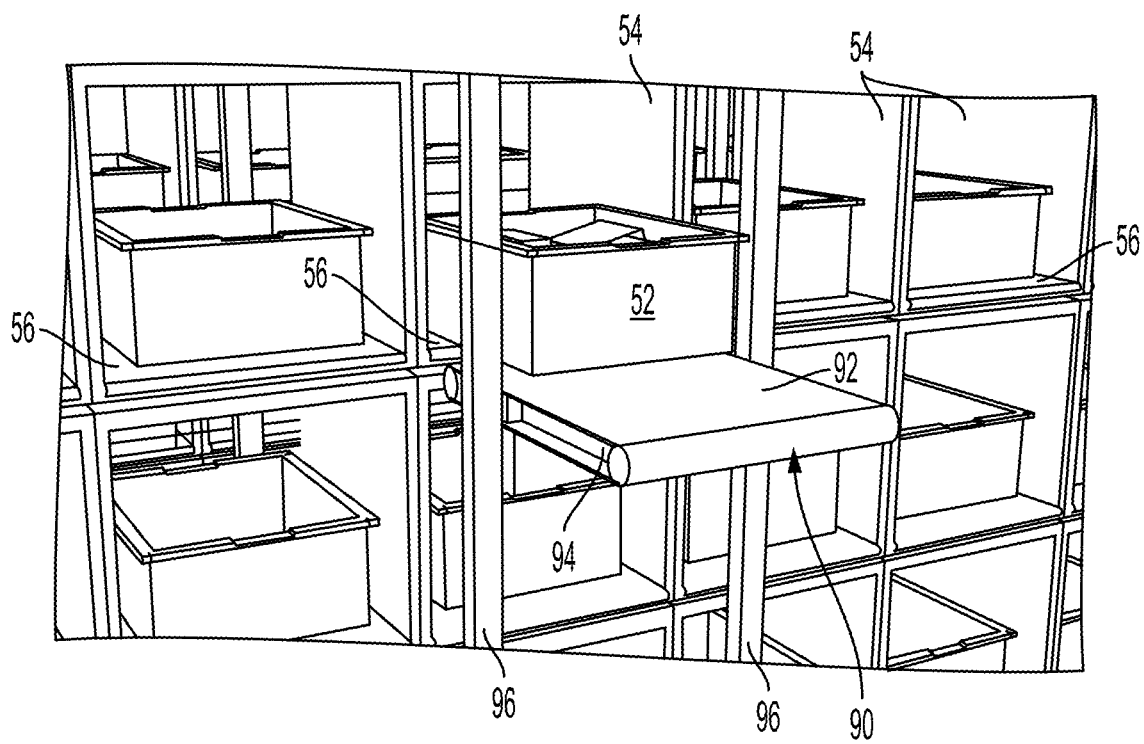
FIGS. 11A and 11B show illustrative diagrammatic views of a completed destination container being removed from a container array to a destination container movement system.
Figure 11B:
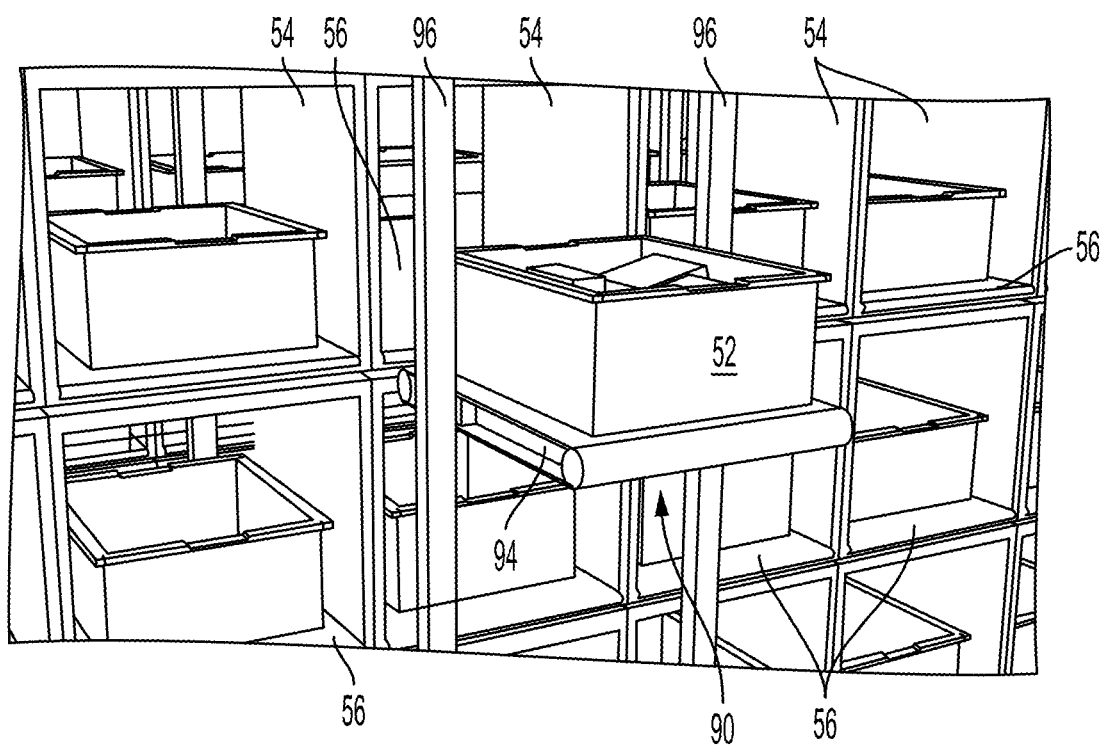
Figure 12A:
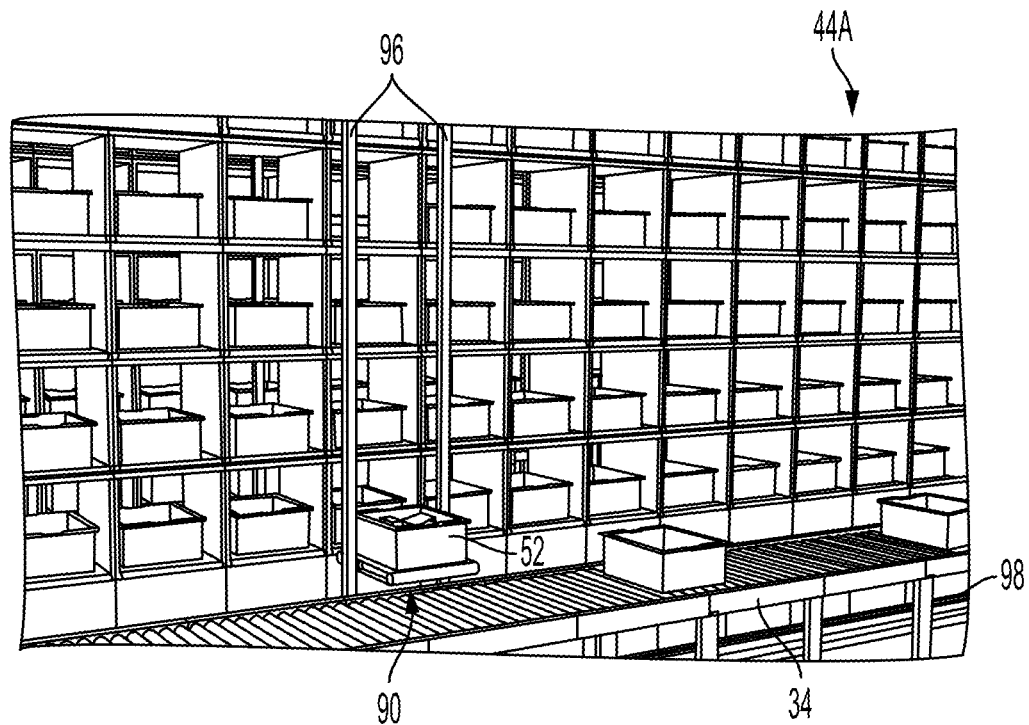
FIGS. 12A and 12B show illustrative diagrammatic views of the completed destination container of FIGS. 11A and 11B being moved from the destination container movement system to an output conveyor.
Figure 12B:
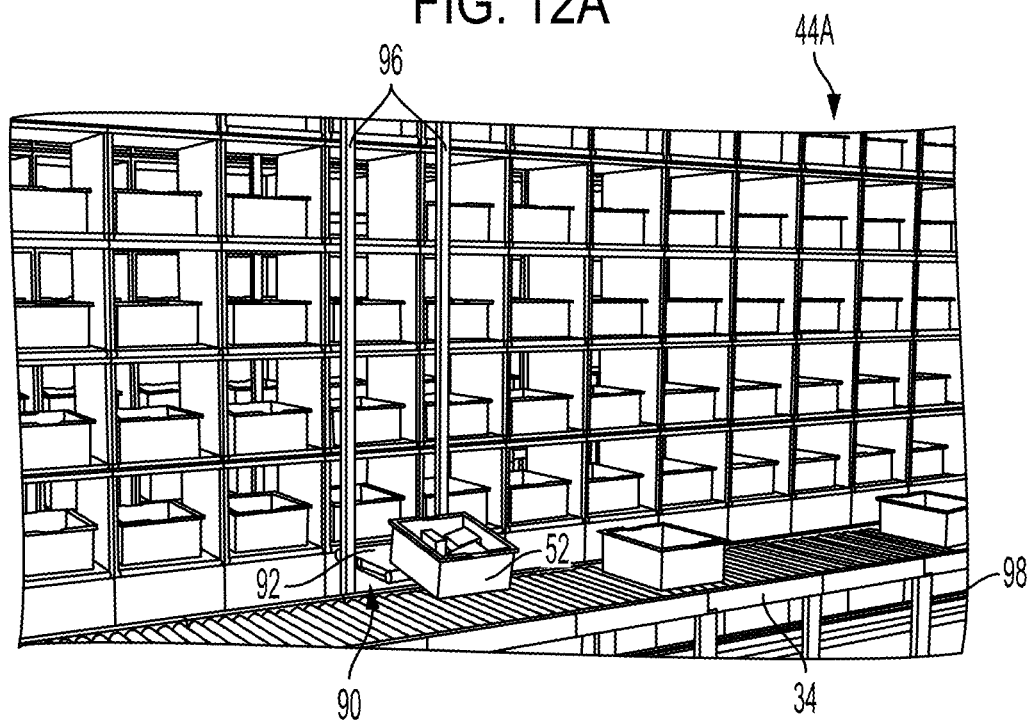

The container movement unit 90 is brought to the completed destination container 52 along the container movement vertical rails 96 and the container movement horizontal rails 98, and the storage conveyor 56 then urges the container 52 onto the container conveyor 92 of the container movement unit 90 as shown in FIGS. 11A and 11B (the container conveyor 92 may move to assist the transfer as well). The container movement unit 90 is then moved downward toward the associated output conveyor 34 (FIG. 12A), and the container conveyor 92 engaged to move the completed destination conveyor 52 onto the output conveyor 34 (FIG. 12B). In this way, completed destination containers are removed from the vertically stacked arrays and onto output conveyors as needed. The movement of objects into destination containers at a first side of the destination containers, and having the completed destination containers removed from an opposite second side, permits the object conveyance system to continue to operate while destination containers are being replenished.

Figure 13A:
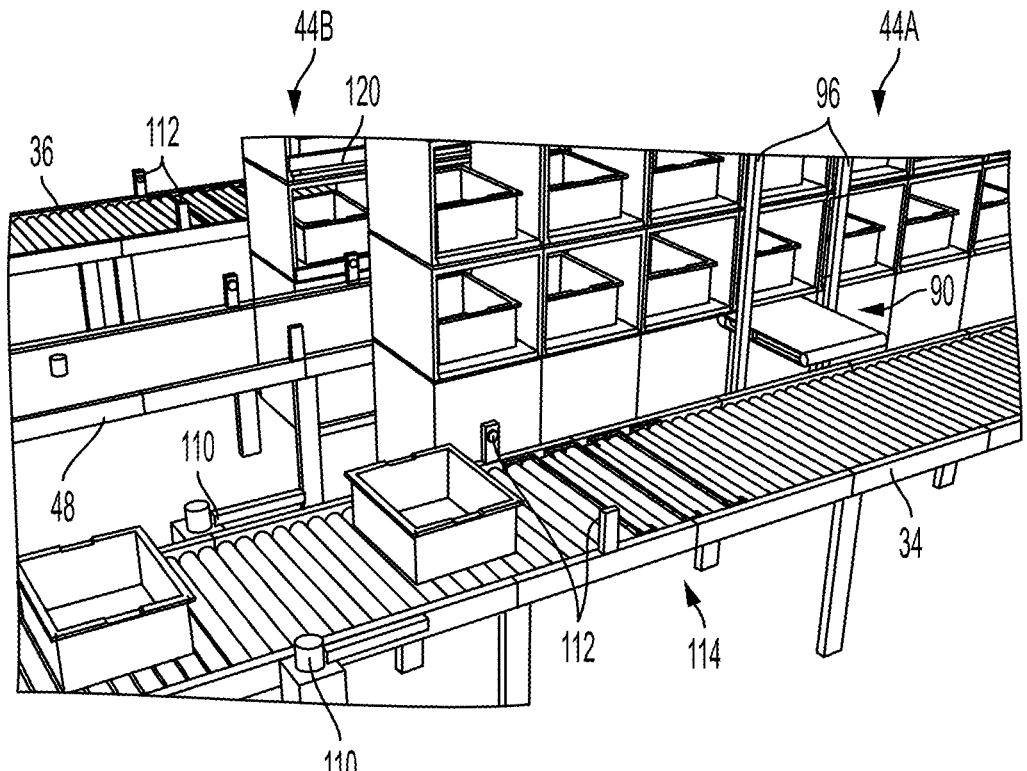
FIGS. 13A-13C show illustrative diagrammatic views of an empty container being provided to the destination container movement system.
Figure 13B:
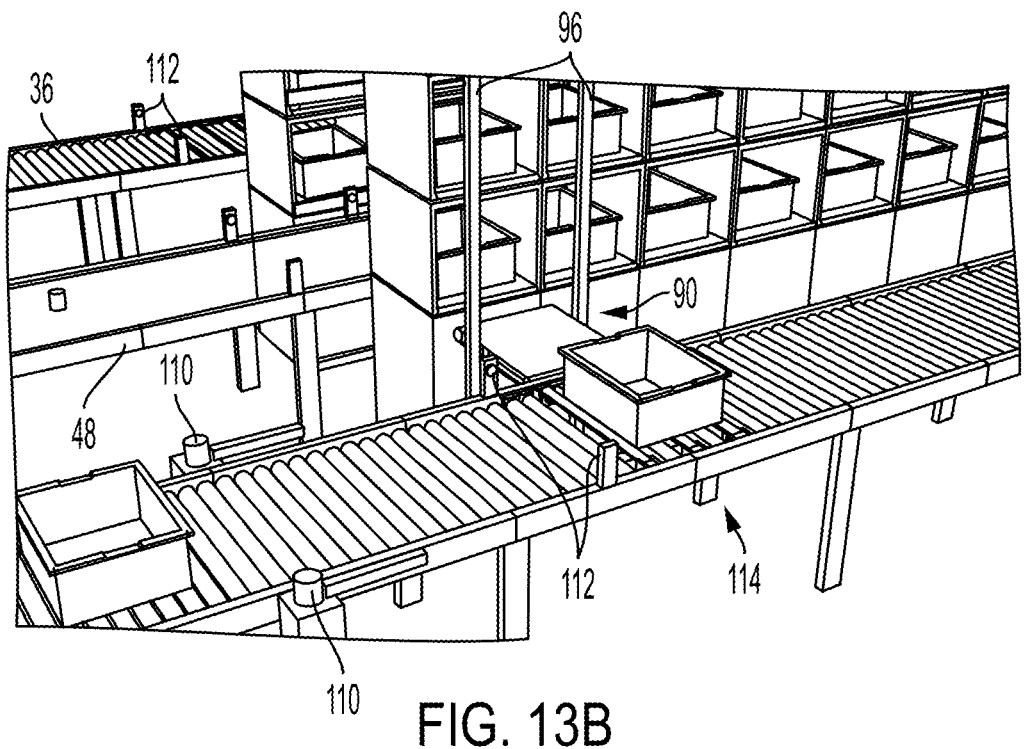
Figure 13C:
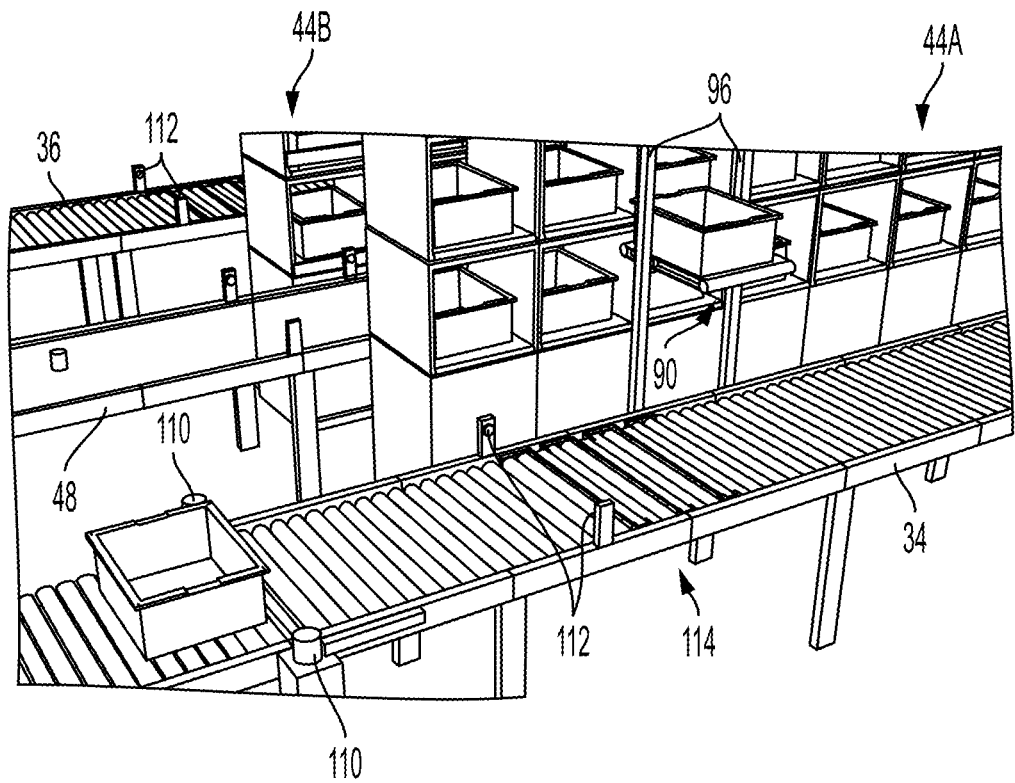
Figure 14:
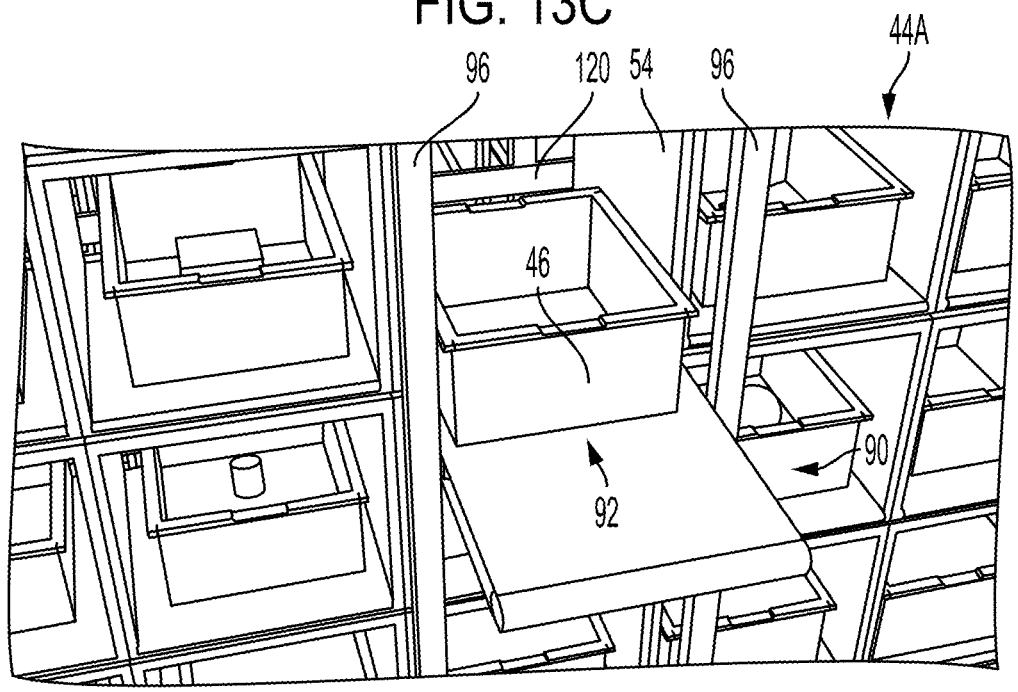
FIG. 14 shows an illustrative diagrammatic view of an empty container being provided from destination container movement system to the container array of FIGS. 11A and 11B.

Empty containers may also be provided to the vertically stacked arrays using the container movement system. In particular, empty containers may be provided (e.g., at an input end of each conveyor 34, 36 and may be retained until needed by gates 110 as shown in FIG. 1. When an empty container is needed, gates 110 open and an empty container travels toward a loading station that includes sensor 112 and a bi-directional conveyor section 114 as shown in FIG. 13A. At the same time, the container movement unit 90 is moved toward the loading station, at which the bi-directional conveyor section 114 engages elevated belts (as shown in FIG. 13B) to move the empty container onto the container conveyor 92 of the container movement unit 90. The container movement unit 90 is then moved along the container movement vertical rails 96 and the container movement horizontal rails 98 (shown in FIG. 13C) to position the empty container adjacent the empty open storage location. As shown in FIG. 14, at the open storage location 54, the container conveyor 92 is engaged to move the empty container onto the storage conveyor 56 of the location 54. The storage conveyor 56 may facilitate this transfer by drawing the empty container into the location 54, and further urges the empty container against an inner brace 120 so as to position each container as close as possible to the routing conveyance system.

Figure 15:
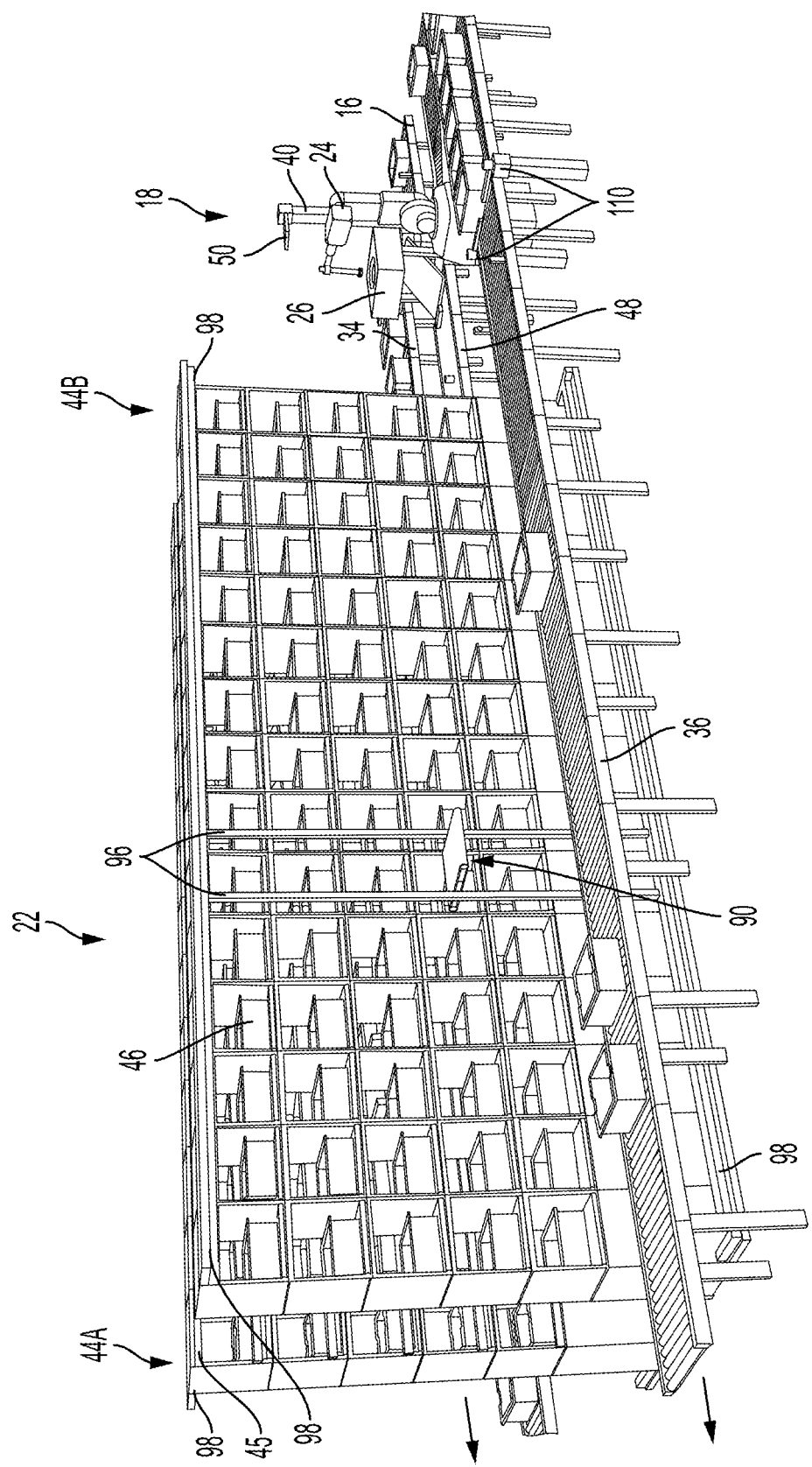
FIG. 15 shows an illustrative diagrammatic rear isometric view of the storage, retrieval and processing system of FIG. 1.

FIG. 15 shows a rear isometric view from the output end of the system showing the vertically stacked array 44B of containers adjacent the output conveyor 36, which also includes an empty container supply system including gates 110, sensors 112 and a bi-directional conveyor 114. The array 44B also includes a container movement system as discussed above including container movement unit 90 and the container movement vertical rails 96 and the container movement horizontal rails 98. Again, the system is controlled by one or more computer processing systems 100, and sensors on the conveyors may be used to monitor the locations of bins and containers on the conveyors.

Those skilled in the art will appreciate that numerous modifications and variations may be made to the above disclosed embodiments without departing from the spirit and scope of the invention as claim.

What is claimed is:

1. A storage, retrieval and processing system for processing objects, said storage, retrieval and processing system comprising:
   a plurality of bins including objects to be distributed, said plurality of bins being provided on an input conveyance system;
   an articulated arm that includes an end effector for grasping and moving a selected object among the objects within at least one of the plurality of bins in an input area of the input conveyance system;
   a drop perception unit providing perception data regarding the selected object that is presented to the drop perception unit by the articulated arm; and
   a routing conveyance system including at least one object conveyor that receives the selected object and moves the selected object in each of horizontal and vertical directions in the space between two vertically stacked arrays of destination containers to directly reach a selected destination container in either of the two vertically stacked arrays of destination containers responsive to the perception data, wherein the at least one object conveyor urges the selected object into the selected destination container in a third direction that is orthogonal to the horizontal and vertical directions.

2. The storage, retrieval and processing system as claimed in claim 1, wherein the object conveyor is mounted to a routing vertical rail system.

3. The storage, retrieval and processing system as claimed in claim 2, wherein the routing vertical rail system is mounted on a routing horizontal rail system.

4. The storage, retrieval and processing system as claimed in claim 1, wherein the storage, retrieval and processing system further includes a destination container movement system for removing completed destination containers from an opposite side from which the destination container was loaded.

5. The storage, retrieval and processing system as claimed in claim 4, wherein the destination container movement system moves the completed destination containers in each of removal horizontal and vertical directions toward an output conveyor.

6. The storage, retrieval and processing system as claimed in claim 4, wherein the destination container movement system includes a container conveyor that is mounted to a container movement vertical rail system.

7. The storage, retrieval and processing system as claimed in claim 6, wherein the container movement vertical rail system is mounted on a container movement horizontal rail system.

8. The storage, retrieval and processing system as claimed in claim 7, wherein the container conveyor is positionable to provide the selected destination container to an output conveyor.

9. A storage, retrieval and processing system for processing objects, said storage, retrieval and processing system comprising:
   a plurality of bins including objects to be distributed, said plurality of bins being provided on an input conveyance system;
   an articulated arm that includes an end effector for grasping and moving a selected object among the objects within at least one of the plurality of bins in an input area of the input conveyance system; and
   a routing conveyance system including a first object conveyor and a second object conveyor, each object conveyor being provided for receiving a selected object, and for moving the selected object from the input area in each of horizontal and vertical directions in the space between two vertically stacked arrays of destination containers and directly reach a destination container in either of the two vertically stacked arrays of destination containers,
   wherein each object conveyor urges the selected object in a third direction that is orthogonal to the horizontal and vertical directions into the destination container, and wherein the first and second object conveyors are adapted to travel along the horizontal and vertical directions and to avoid colliding with one another by traveling in circuits, one of which is time delayed with respect to the other.

10. The storage, retrieval and processing system as claimed in claim 9, wherein each object conveyor is mounted to a routing vertical rail system.

11. The storage, retrieval and processing system as claimed in claim 10, wherein the routing vertical rail system is mounted on a routing horizontal rail system.

12. The storage, retrieval and processing system as claimed in claim 10, wherein the storage, retrieval and processing system further includes:
   a drop perception unit providing perception data regarding a selected object that is presented to the drop perception unit by the articulated arm, and
   a destination container movement system that moves completed destination containers in each of removal horizontal and vertical directions toward an output conveyor responsive to the perception data.

13. The storage, retrieval and processing system as claimed in claim 12, wherein the destination container movement system includes a container conveyor that is mounted to a container movement vertical rail system.

14. The storage, retrieval and processing system as claimed in claim 13, wherein the container movement vertical rail system is mounted on a container movement horizontal rail system.

15. The storage, retrieval and processing system as claimed in claim 14, wherein the container conveyor is positionable to provide the selected destination container to an output conveyor.

16. A method of providing storage, retrieval and processing of objects, said method comprising:
   providing on a conveyance system a plurality of bins including objects to be distributed;
   grasping and moving objects within at least one of the plurality of bins in an input area of the conveyance system using an articulated arm that includes an end effector for grasping and moving any of the objects within at least one of the plurality of bins in an input area of the input conveyance system;
   providing perception data by a drop perception unit regarding a selected object that is presented to the drop perception unit by the articulated arm;
   routing the selected object on a first object conveyor that moves in each of horizontal and vertical directions in the space between two vertically stacked arrays of destination containers to directly reach a selected destination container in either of the two vertically stacked arrays of destination containers responsive to the perception data using a first object conveyor; and
   urging the selected object from the first object conveyor into the selected destination container in a third direction that is orthogonal to the horizontal and vertical directions.

17. The method as claimed in claim 16, wherein routing the selected object in each of horizontal and vertical directions includes moving the first object conveyor along vertical and horizontal directions in a circuit.

18. The method as claimed in claim 17, wherein the method further includes:
- routing a further selected object in each of the horizontal and vertical directions toward a further selected destination container responsive to the perception data using a second object conveyor; and
- urging the selected object from the second object conveyor into the further selected destination container, each of the first and second object conveyors being adapted to travel along the horizontal and vertical directions and to avoid colliding with one another by traveling in circuits, one of which is time delayed with respect to the other.

19. The method as claimed in claim 16, wherein the method further includes removing completed destination containers using a destination container movement system for moving completed destination containers in each of removal horizontal and vertical directions toward an output conveyor.

20. The method as claimed in claim 17, wherein the method further includes moving the selected destination container to an output conveyor.

\* \* \* \* \*